(12) United States Patent
Stanton et al.

(10) Patent No.: US 8,100,407 B2
(45) Date of Patent: Jan. 24, 2012

(54) PACKING CARTRIDGES AND PRESSURE-DAMPENING ELEMENTS FOR PLUNGER-TYPE PUMPS

(76) Inventors: Eddie N. Stanton, Odessa, TX (US); Michael L. Strickland, Odessa, TX (US)

( * ) Notice: Subject to any disclaimer, the term of this patent is extended or adjusted under 35 U.S.C. 154(b) by 464 days.

(21) Appl. No.: 10/798,693

(22) Filed: Mar. 11, 2004

(65) Prior Publication Data

US 2005/0200081 A1 Sep. 15, 2005

(51) Int. Cl.
*F16J 15/34* (2006.01)
(52) U.S. Cl. .......... 277/511; 277/521; 277/522; 166/68; 166/105
(58) Field of Classification Search .................. 277/511, 277/516, 520, 521, 522, 540; 166/68, 68.5, 166/105
See application file for complete search history.

(56) References Cited

U.S. PATENT DOCUMENTS

| | | | |
|---|---|---|---|
| 1,013,745 A | 1/1912 | Clark | |
| 1,624,852 A | 4/1927 | Trautner | |
| 2,126,007 A | 8/1938 | Guiberson et al. | |
| 2,485,940 A | 10/1949 | Tremolada | |
| 2,716,034 A | 8/1955 | Main | |
| 2,745,687 A | 5/1956 | Stack | |
| 2,809,059 A | 10/1957 | Hillis | |
| 3,232,639 A * | 2/1966 | Kosinski et al. | 285/81 |
| 3,366,425 A | 1/1968 | Genz | |
| 3,419,280 A | 12/1968 | Wheeler | |
| 3,588,126 A | 6/1971 | McKillop et al. | |
| 3,735,991 A | 5/1973 | Nobbs | |
| 3,762,725 A * | 10/1973 | Taylor | 277/330 |
| 3,785,659 A | 1/1974 | Maurer et al. | |
| 3,833,228 A | 9/1974 | Gilliam, Sr. | |
| 3,887,198 A | 6/1975 | McClure et al. | |
| 3,907,307 A | 9/1975 | Maurer et al. | |
| 4,135,546 A * | 1/1979 | Morrison | 137/315.28 |
| 4,155,559 A * | 5/1979 | Sieghartner | 277/396 |
| 4,289,317 A | 9/1981 | Kuc | |
| 4,351,531 A | 9/1982 | Maasberg et al. | |
| 4,394,872 A | 7/1983 | Schobl | |
| 4,602,791 A * | 7/1986 | Zollner | 277/584 |
| 4,630,636 A | 12/1986 | Cutcher | |
| 4,758,135 A | 7/1988 | Woodward et al. | |
| 4,775,303 A * | 10/1988 | Liska | 417/554 |
| 4,867,460 A | 9/1989 | Colo | |
| 4,878,815 A | 11/1989 | Stachowiak | |
| 5,062,397 A | 11/1991 | Larson | |

(Continued)

FOREIGN PATENT DOCUMENTS

WO WO 01/09535 A1 2/2001

*Primary Examiner* — Gilbert Lee

(57) ABSTRACT

A package cartridge is provided for use in the maintenance of a packing bore for a plunger-type pump. According to one aspect, a packing cartridge includes: a generally-cylindrical sleeve adapted to be at least partially positioned in the packing bore, a first abutment ring positioned in the sleeve, and a second abutment ring positioned in the sleeve and co-axially spaced apart from the first abutment ring. Telescoping structures are operatively positioned between the first abutment ring and the second abutment ring. According to another aspect, a structure forming a circumferential pressure-ring groove is provided. A pressure ring is positioned in the pressure-ring groove, the pressure ring having at least one smaller external dimension than an internal dimension of the pressure-ring groove, whereby at least one clearance is provided between the pressure-ring groove and the pressure ring. These aspects can be advantageously practiced together.

31 Claims, 23 Drawing Sheets

U.S. PATENT DOCUMENTS

| | | |
|---|---|---|
| 5,088,745 A | 2/1992 | Peppiatt et al. |
| 5,090,087 A * | 2/1992 | Hipple et al. .................... 15/317 |
| 5,263,682 A * | 11/1993 | Covert et al. ................. 251/214 |
| 5,267,533 A | 12/1993 | Smith |
| 5,297,805 A | 3/1994 | Merkin et al. |
| 5,636,688 A * | 6/1997 | Bassinger .................... 166/84.4 |
| 5,636,975 A | 6/1997 | Tiffany et al. |
| 5,716,055 A | 2/1998 | Wilkinson et al. |
| 5,845,909 A | 12/1998 | Angelo et al. |
| 6,167,959 B1 * | 1/2001 | Bassinger et al. ........... 166/84.2 |
| 6,428,291 B1 | 8/2002 | Baerlin et al. |

* cited by examiner

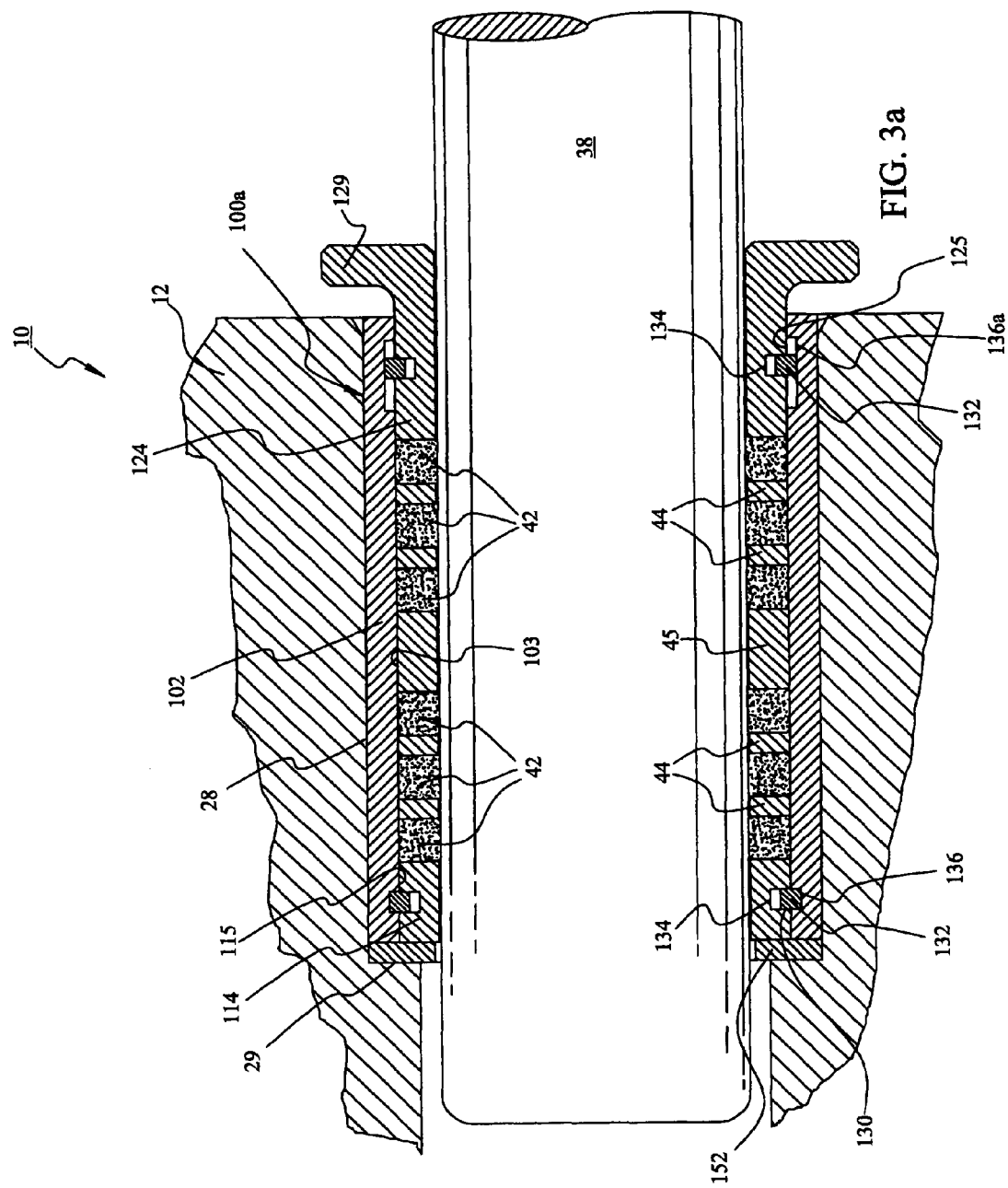

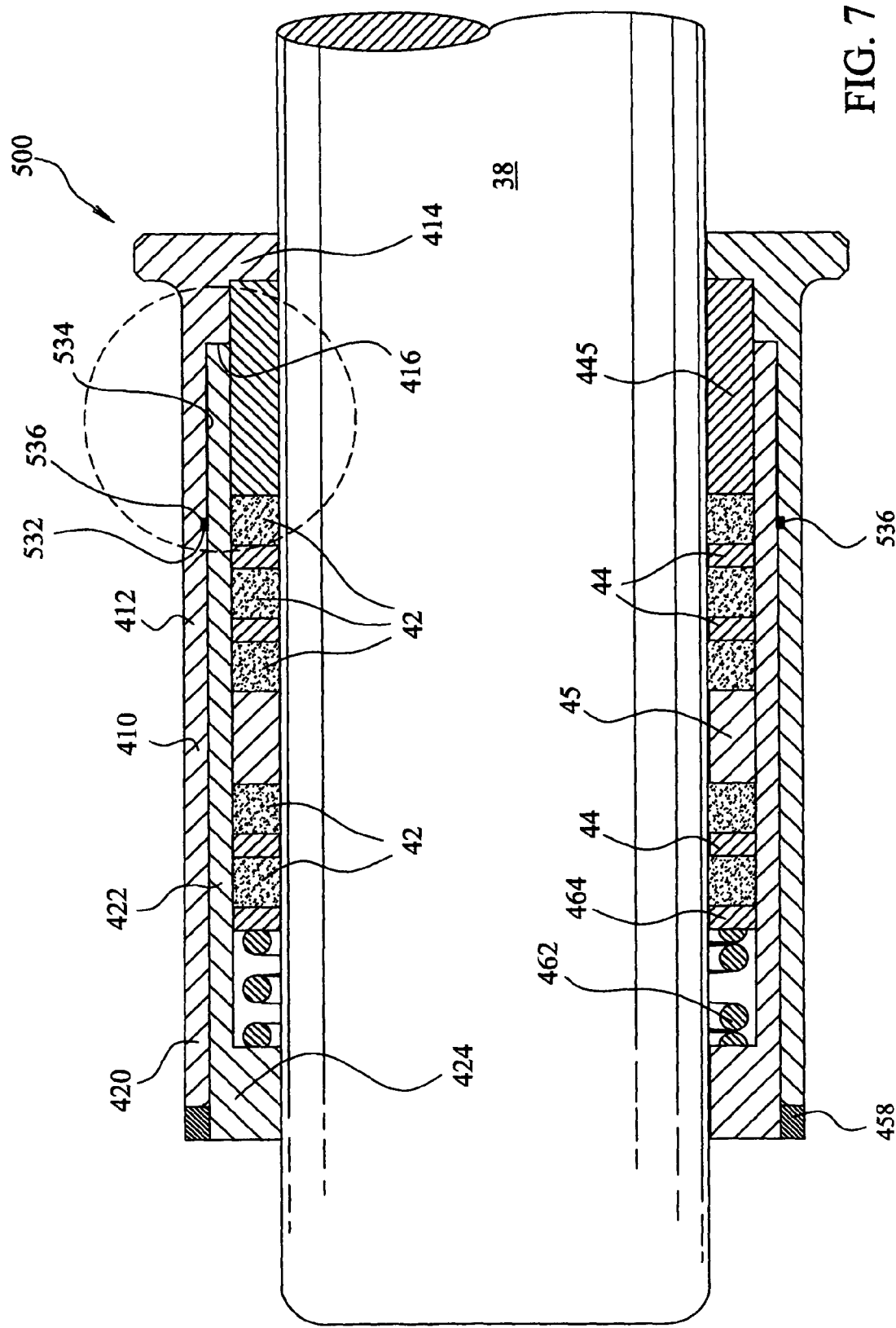

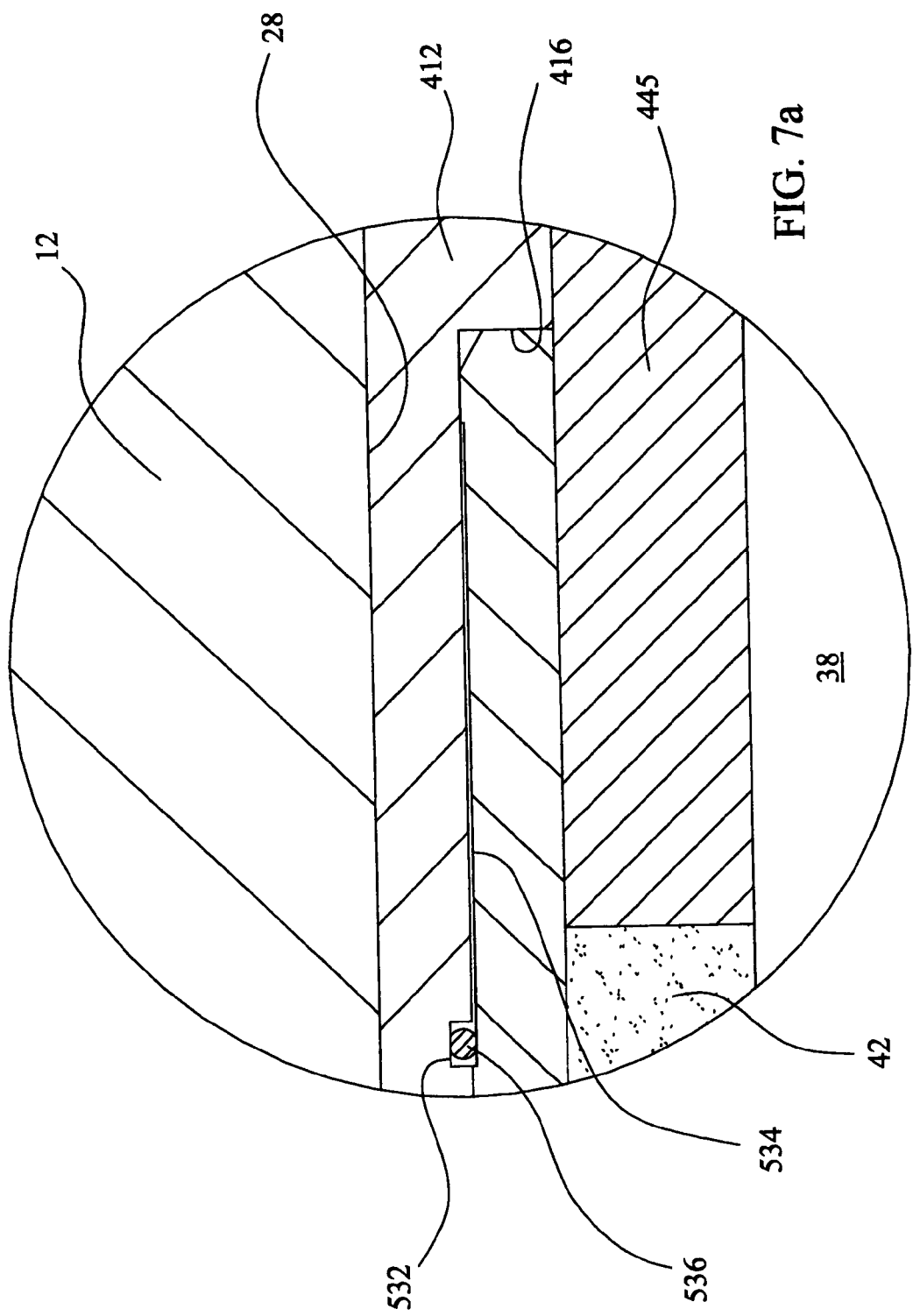

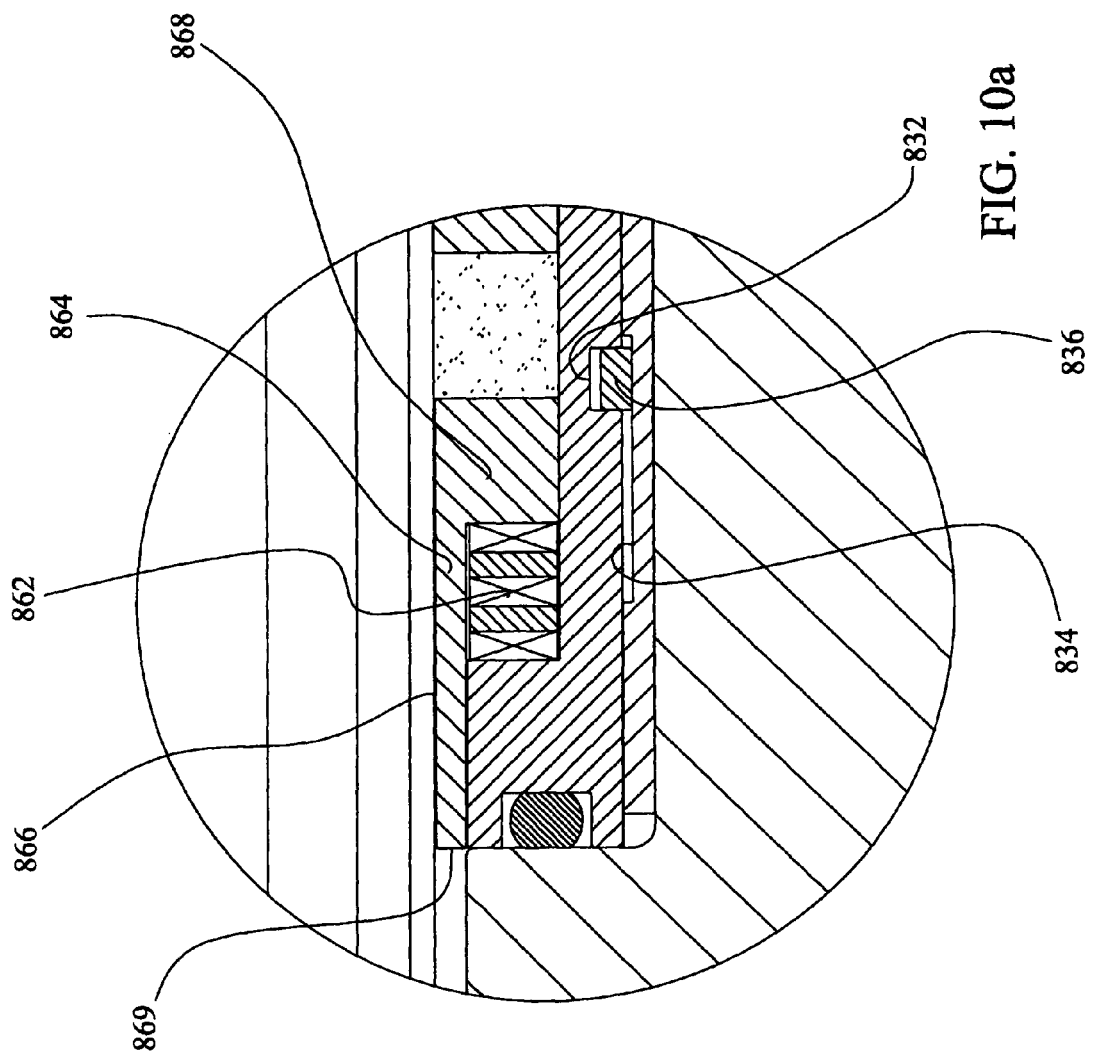

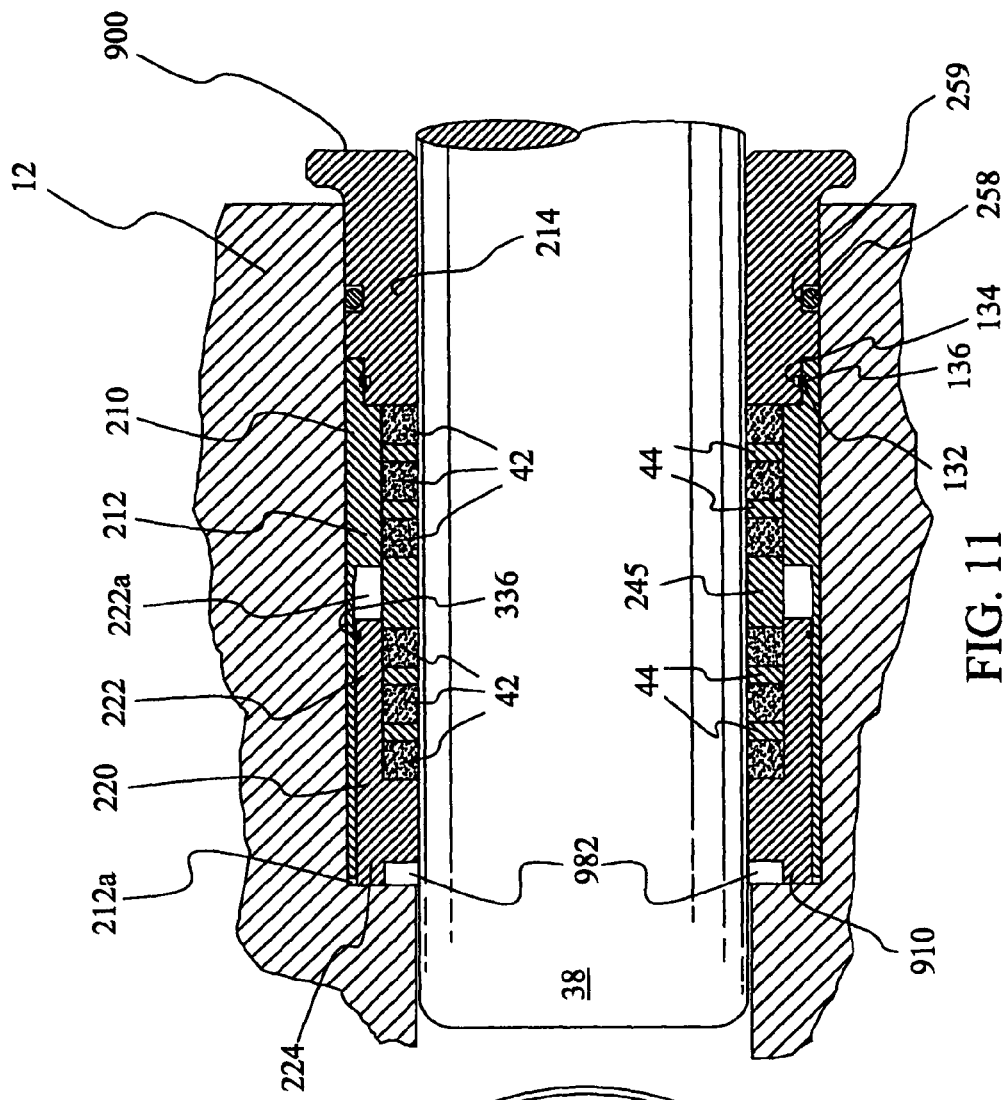
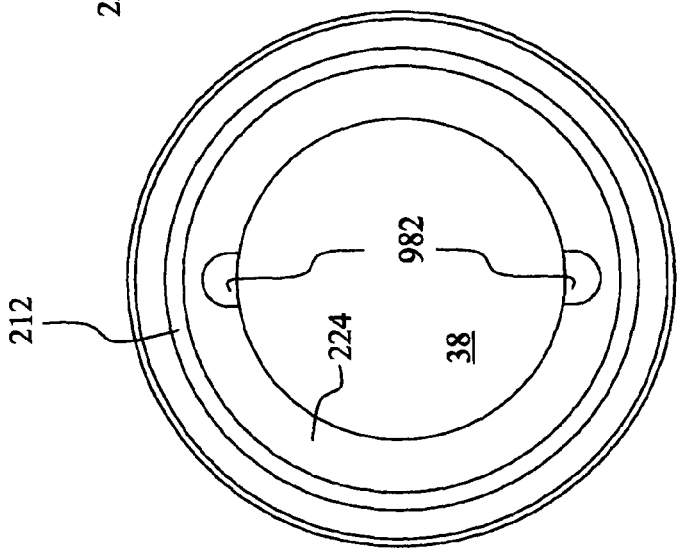
FIG. 11
FIG. 11a

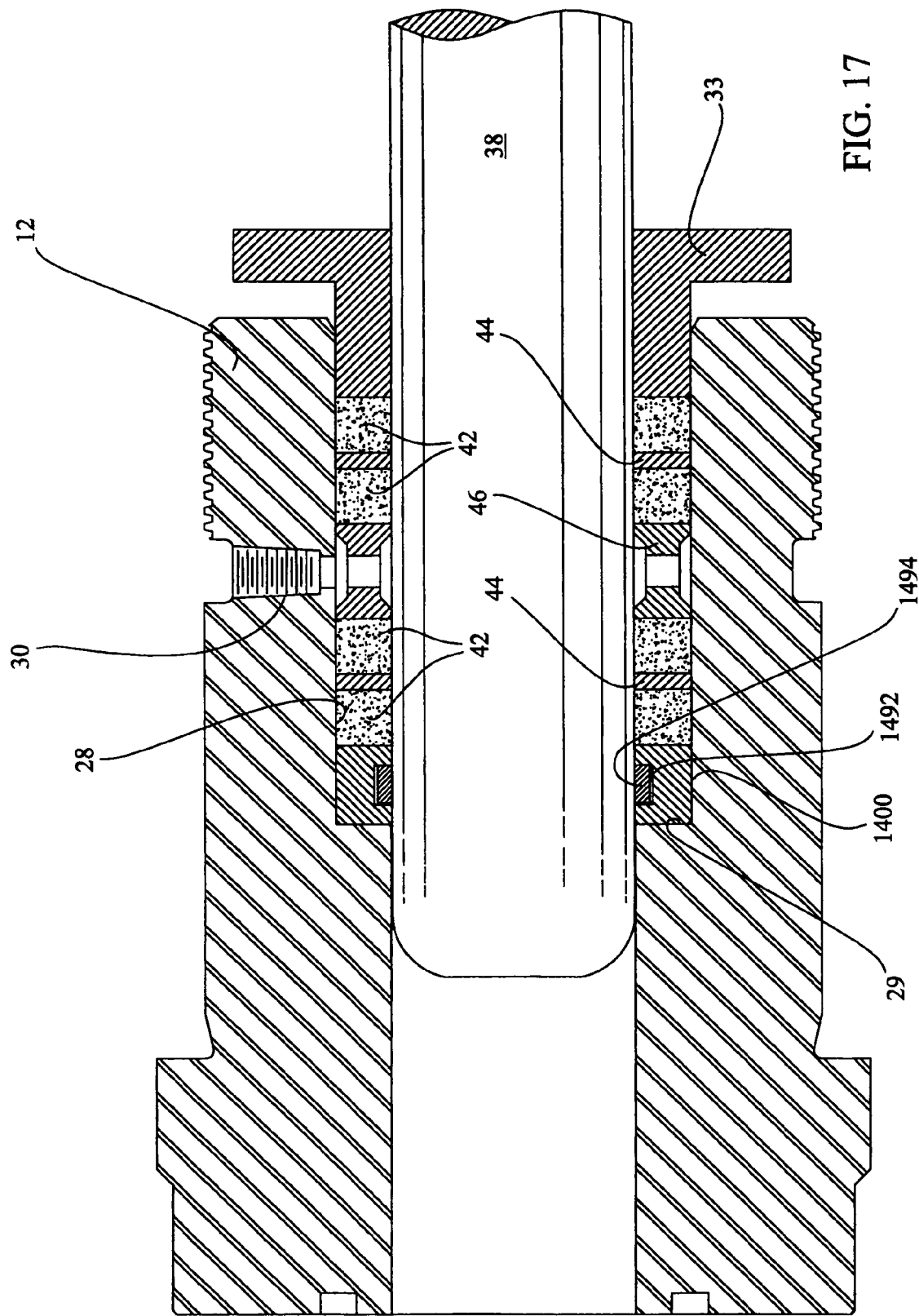

PACKING CARTRIDGES AND PRESSURE-DAMPENING ELEMENTS FOR PLUNGER-TYPE PUMPS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

TECHNICAL FIELD

The present invention generally related to positive-displacement pumps, and, more particularly, to plunger-type pumps. More particularly still, the invention related to the packing seals and assemblies for reciprocating plungers in such pumps. The invention also related to the maintenance and use of such fluid pumps.

BACKGROUND

A positive-displacement pump, sometimes referred to as a reciprocating fluid pump or as a reciprocating power pump, is a type of fluid pump driven by power from an outside source applied to the pump.

There are several types of reciprocating power pumps. Typically, the pumps are classified as being plunger pumps or piston pumps. A plunger pump is differentiated from a piston pump in that a plunger moves past stationary packing, whereas a piston carries packing with it. A major problem associated with positive-displacement fluid pumps, especially high-pressure pumps, is that of providing a satisfactory seal for the piston or plunger.

The pumps are also classified as either single acting or double acting. In a single-acting pump, liquid is discharged only during the forward stroke of the plunger or piston, that is, during one-half of the revolution. In a double-acting pump, liquid is discharged during both the forward and return strokes of the piston or pair of opposed plungers. That is, discharge takes place during the entire revolution.

Further, the pumps are often classified as being horizontal or vertical. In a horizontal pump, the axial centerline of the cylinder is horizontal. In a vertical pump, the axial centerline of the cylinder is vertical.

In addition, the pumps can be classified based on the number of plungers or pistons. A simplex pump contains only one piston or one plunger or a pair of opposed plungers driven by one connecting rod. A duplex pump contains two pistons or two plungers or two pair of opposed plungers driven by two connecting rods. A multiplex pump contains more than two pistons or two single-acting or opposed plungers. For example, a pump having three plungers or pairs of opposed plungers is commonly referred to as a triplex pump, and a pump having five plungers or pairs of opposed plungers is commonly referred to as a quintuplex pump.

Generally, a positive-displacement pump has a fluid end (sometimes referred to as the liquid end) and a power end.

The fluid end is that portion of the pump that handles the fluid. It consists of a pumping chamber (sometimes referred to as a compression, fluid, or liquid chamber or cylinder), and various ports, valves, and other components.

The pumping chamber is a chamber or plurality of chambers in which the motion of the plunger(s) or piston(s) is imparted to the liquid (or fluid). A piston or plunger is positioned to reciprocate in a cylindrical port, which can be considered to be the pumping chamber or a portion of the pumping chamber. The cylindrical port for the piston or plunger is a heavy-walled structure adapted for withstanding the high forces of containing the reciprocating piston or plunger.

A piston is a cylindrical body that is attachable to a rod and is capable of exerting pressure upon a liquid within the pumping chamber. A piston usually has grooves for containing rings that seal against the generally smooth interior cylindrical wall of the cylindrical port or against a replaceable cylinder liner placed in the cylindrical port as the piston reciprocates.

A plunger is a smooth rod that is attachable to a crosshead and is capable of exerting pressure upon a liquid within the pumping chamber. Sealing rings for a plunger are stationary, the plunger sliding within the rings. The cylindrical port for a plunger-type pump typically has two portions with different diameters, a plunger bore and an axially aligned packing bore. The packing bore has a larger diameter than the plunger bore, so that the packing bore is adapted for accommodating packing between the interior cylindrical wall of the packing bore and the outward cylindrical surface of the plunger.

The pumping chamber can be made integral with a suction manifold and discharge manifold or can be made with separate manifolds. A suction manifold is a chamber that accepts liquid from the suction port(s) and distributes it to the suction valves. A discharge manifold is a chamber that accepts liquid from the individual discharge valves and directs it to the discharge port(s).

The power end is that portion of the pump in which the rotating motion of the crankshaft is converted to a reciprocating motion through connecting rods and crossheads. The power frame is that portion of the power end that contains the crankshaft, connecting rods, crosshead and bearings used to transmit power and motion to the fluid end.

The power frame of the power end is held in a substantially permanent, stationary position. The fluid end is typically bolted to the power frame and is cradled by the power frame. Sometimes, a frame extension connects the fluid end to the power frame when the fluid end is not bolted directly to the power frame. In any case, the fluid end is not unbolted and disconnected from the power end except for major maintenance overhaul of the fluid end.

The typical fluid end of a plunger-type pump includes a fluid-end pump body having at least one pumping chamber. The pumping chamber has a suction port (sometimes referred to as an intake port), a discharge port, and a cylindrical port (or, in the case of a double-acting plunger-type pump, a pair of opposed cylindrical ports). The cylindrical port in a plunger-type pump includes a plunger bore and an axially aligned packing bore. In some pumps, an internal lubrication port is provided for supplying lubricant to the packing bore, which lubricant can be distributed around an internal circumference of the packing bore by a lantern ring, as well know to those skilled in the art. An example of the fluid end of this type of pump with original packing and parts for the packing bore is illustrated in FIG. 1.

A suction valve is positioned in the suction port (e.g., in a cylindrical portion of the suction port that is sometimes referred to as the suction valve deck), and a discharge valve is positioned in the discharge port (e.g., in a cylindrical portion of the discharge port that is sometimes referred to as the discharge valve deck). In addition, a plunger is positioned to reciprocate in the cylindrical port having the packing bore and the plunger bore.

The suction valve is usually a spring-loaded check valve for allowing the flow of fluid from the low-pressure side of the pump through the suction port into the pumping chamber while preventing the backflow of fluid through the suction port. The discharge valve is usually a spring-loaded check valve for allowing the flow of fluid from the liquid cylinder through the discharge port to the high-pressure side of the pump with preventing backflow of fluid through the discharge port. Preferably, although not necessarily, the suction and discharge valves are vertically disposed in the pump, that is, the axis of each of the generally cylindrical valves is vertically oriented in the pump body. Furthermore, the vertical axes of the suction and discharge valves are preferably, although not necessarily, co-axially aligned.

The plunger of the pump is positioned to reciprocate back and forth in the cylindrical port of the pumping chamber. The cylindrical port consists of a heavy-walled structural body defining the plunger bore and the packing bore, of which at least the interior cylindrical volume of the plunger bore can be considered to be at least a portion of the pumping chamber. The heavy-walled cylinder of the cylindrical port is designed to withstand the high-reciprocating and high-pressure forces to accommodate the plunger. Typically, at the limit of its stroke, the plunger fills nearly the full length of the cylindrical port, and in some designs exceeds the full length of the cylindrical port and extends into another portion of the plumping chamber.

During the back stroke of the plunger, the withdrawal of the plunger increases the volume of the pumping chamber, which creates decreasing fluid pressure or suction in the chamber. This causes the suction valve in the suction port to open to draw fluid from the low-pressure side of the pump into the pumping chamber. The decreased fluid pressure in the chamber also causes the discharge valve in the discharge port to close, preventing fluid from the high-pressure side of the discharge port from backing up into the pumping chamber.

During the forward stroke of the plunger, the insertion of the plunger decreases the volume of the pumping chamber, which creates increasing fluid pressure in the chamber. This causes the discharge valve in the discharge port to open to pump fluid through the discharge valve to the high-pressure side of the pump. The increased fluid pressure in the chamber also causes the suction valve to close, preventing high-pressure fluid from the pumping chamber from being discharged through the suction port.

As mentioned above, a "packing bore" is provided adjacent the plunger bore in the cylindrical port. The packing bore has a generally cylindrical interior wall with an internal diameter ("I.D.") that is larger than an internal diameter of the plunger bore and that is co-axially aligned with the plunger bore. An annular space is defined between the interior wall of the packing bore and a plunger extending through the packing bore into the plunger bore. In other words, the annular space is also substantially the same as the difference between the I.D. of the packing bore and the I.D. of the plunger bore.

The packing bore typically has a "seat" (sometimes referred to as a "land") adjacent the high-pressure end thereof, which is toward the plunger bore. The seat is generally annular in shape, presenting an annular surface generally facing the low-pressure end of the packing bore, which is away from the plunger bore. The annular surface of the seat is preferably at a substantially perpendicular angle relative to the axis of the interior wall of the packing bore, but it can be at an oblique angle. The central opening in the seat allows for insertion of the plunger through seat. The seat of the packing bore can be formed as a shoulder between the interior wall of the packing bore and the plunger bore.

A removable "gland" (sometimes referred to as a "top gland" or "top piece") is typically positioned adjacent the low-pressure end of the packing bore, which is away from the plunger bore. The gland is for axially capturing and squeezing the packing material or packing set positioned in the annular space within the interior wall of the packing bore against the seat of the packing bore. A central opening in the gland allows for insertion of the piston rod or plunger through the gland.

The gland is generally annular in shape, presenting an annular surface generally facing the high-pressure end of the packing bore, which is toward the plunger bore. The annular surface of the gland is preferably at a substantially perpendicular angle relative to the axis of the interior wall of the packing bore, but it can be at an oblique angle.

The removable gland typically is formed as a part of a body adapted to be removably secured to the body forming the interior wall of the packing bore. For example, the gland can have a circumferential flange or flange lobes through which bolts can be secured to the body forming the interior wall of the packing bore. In another design, the gland can have a circumferential threaded connector adapted to screw with a corresponding circumferential threaded connector on the body forming the interior wall of the packing bore, in which case the gland is sometimes referred to as a "gland nut."

The packing bore is for accommodating relatively soft "packing" in the annular space between the interior wall of the packing bore and the plunger. The packing is for sealingly engaging the plunger to help prevent fluid leakage from around the plunger as it reciprocates in the plunger bore, which enables the compression of fluids in the pumping chamber.

The packing bore can accommodate various styles of packing. Historically, loose packing material was simply "stuffed" into the packing bore. Early on, packing material was formed into ring-shaped packing elements. The packing elements can be formed into rings having a rectangular or square cross-section. The packing rings can be split rings to facilitate assembly or removal of the packing rings from the packing bore. Because the packing material is relatively soft, a plurality of such packing elements is often backed-up with intermediate rigid washer-shaped rings or spacers. More recently, the engineering of the packing rings and other associated parts of the packing set has become increasingly sophisticated. The stack of the plurality of packing elements, intermediate spacers, and other pieces that can be used in the packing bore are collectively referred to as a "packing stack" or "packing set" or "packing assembly."

The seat of the packing bore provides a land area for the packing set, including the packing and associated parts and pieces. With the packing rings and other pieces of a packing set are positioned in place in the packing bore against the seat, the plunger inserted through the packing set. Then the gland is then positioned in place over the packing set. The gland, when tightened, axially compresses and squeezes the packing set. This action causes the shape of soft packing material to distort, creating a tight sealing area between the packing bore and the outside diameter of the plunger, preventing any substantial leak of internal compressed fluids from around the plunger.

The packing material (or packing set) is axially captured and retained within the interior wall of the packing bore between the seat of the packing bore and the gland, which is positioned and tightened over the packing. Over-tightening of the gland on the packing can cause excessive friction as the plunger reciprocates through the packing elements, causing excess wear, heat, and even breakage of the plunger.

As mentioned above, a major problem associated with positive-displacement fluid pumps, especially high-pressure pumps, is that of providing a satisfactory seal for the plunger. This seal has normally been in the form of soft, nonabrasive packing elements adapted to seal the annular space between the pump plunger and the bore of the packing bore. During the power stroke of the plunger, the internal pump pressure acting axially on the packing set helps the packing rings to deform or deflect into sealing engagement between the reciprocating plunger and the packing bore.

Of course, the packing seals wear as the plunger reciprocates, and the fluid pumps require periodic maintenance to replace the worn seals. The wear on the plunger packing is a particularly serious problem when the fluid being pumped contains suspended particles of silt, clay, sand, or other abrasive material. The abrasive material tends to erode the packing causing early and frequent failure. Packing failure is normally evidenced by the leakage of fluid past the packing. A small amount of leakage can be tolerated, but when this becomes excessive, the pumping operation must be stopped to permit replacement of the packing.

The typical packing needs to be replaced ever few months of pump operation. This maintenance involves tedious and time-consuming operations, including removal of the packing gland, removal of the worn packing elements from the packing bore, re-assembly of new packing elements in the packing bore, and replacement and proper tightening of the gland.

Eventually, typically after about two-to-three years of pump operation, however, the packing bore itself will require a major overhaul. During the reciprocating action of the plunger, the parts and pieces of the packing set have slight movement and this, along with corrosion, vibration and other factors, will cause the packing bore surface to deteriorate. Further, as the packing wears and loosens, the packing will in turn will increasingly wear on the interior cylindrical wall of the plunger bore. Eventually, the packing bore becomes useless as a sealing surface to prevent the compressed product from escaping from the pumping chamber to the pump exterior. Then it becomes necessary to recondition the packing bore diameters in a major overhaul of the pump. This is usually done by boring out the packing bore inside diameter to accommodate a sleeve, which replaces the original packing bore sealing surfaces with a new one.

Sometimes it is desirable to change the size of the plunger. The diameter of the packing bore, however, must be in a reasonable proportion to the diameter of the plunger and have a sufficient clearance to accommodate the cross-section of the packing. For example, a plunger having a 2-inch diameter can be positioned in a packing bore having 3-inch diameter, which provides a typical circumferential clearance of 0.5 inch. This allows for a packing material having a 0.5 inch cross-section (if square packing material is used) to fill the annular space between the outside diameter of the plunger and the internal packing bore diameter.

When it is desired to change the size of the plunger, the packing bore would then be of the wrong proportion. Many times, for example, it is desirable to increase pump internal pressures. One way of doing this is to decrease the plunger diameter. Doing this, of course, increases the clearance between the plunger bore and plunger outer diameter. Up to a reasonable extent, the increased clearance can be compensated with a packing having a larger cross-section. Alternatively, it is possible to re-bore and sleeve the original packing bore to reduce the internal diameter of the packing bore, and allow for the use of a packing having a more appropriate cross-section. However, this alternative requires major overhaul of the pump.

In many pumps, the packing bore is integrally formed as part of the fluid-end body. An example of this type of prior-art pump is illustrated in FIG. 1, which is hereinafter described in detail.

In a few pumps, a "stuffing box" is permanently captured in the fluid-end body by the attached power frame, in which case this stuffing box provides the packing bore. An example of this design is the Wheatley® "323" pump is illustrated in FIG. 2, which is hereinafter described in more detail. However, this stuffing-box design is adapted for major overhaul of the fluid end and does not allow for the removal of the stuffing box without removing the fluid end from the power frame. Essentially, the packing bore is formed in a non-integrally formed, but permanently installed stuffing box in a fluid-end body. The packing is routinely maintained without removal of this type of permanently installed stuffing box.

In other of pumps, a "stuffing box" is permanently bolted to the fluid-end body of the pump, although it can be removed without removal of the fluid end from the power frame. Such a separate stuffing box is massive and expensive because, in essence, it is a structural portion of the fluid end body. Essentially, the packing bore is formed in a non-integrally formed, but permanently attached stuffing box to a fluid-end body. The packing is routinely maintained without removal of this type of permanently attached stuffing box. When the packing bore wears to the point it needs major service, such a stuffing box portion of the fluid-end body can be removed for easier re-manufacturing or re-sleeving.

Conventional plunger packings also present design problems in packing assemblies that require lubrication. In order to avoid excessive wear on the plunger and excessive friction, it is essential in certain high-pressure pumps to maintain a lubricant film between the plunger and the packing. In such pumps, lubricant is normally introduced into the center of the packing through ports formed in the packing bore. A lubrication system is employed for this purpose, including a lubricating ring, frequently referred to in the art as a lantern ring, is positioned with packing, usually between the packing elements and provides space for introducing a lubricant such as oil or grease into the packing set. The lubricant is normally introduced continually at a preset pressure into the lantern ring from an external source.

Over the years, many designs have been tried to reduce maintenance costs associated with such fluid pumps, however, problems with reliability and maintenance have continued to plague the pump technology. It has also been desirable to be able to change the size of the plunger used in the pumps. Among other designs, for example, packing cartridges, on occasion, have been tried as plunger packings on reciprocating pumps. The cartridge containing packing elements is adapted to be assembled and secured in the packing bore. The cartridge, being relatively inexpensive, is an expendable member so that when it becomes worn or damaged from use, it can be replaced with a new cartridge. The packing cartridges of the prior art, however, still have various disadvantages.

U.S. Pat. No. 3,785,659, entitled "Packing Cartridge for Reciprocating Pump," issued Jan. 15, 1974, and having for named inventors William C. Maurer and Everett H. Lock, discloses a packing cartridge for a reciprocating pump which includes a sleeve adapted to be connected to a recessed end of the fluid end housing and a packing assembly mounted in the sleeve. A lubricating port formed in the sleeve extends from an exposed end thereof to the interior of the sleeve and provides means for delivering lubricant to the packing assembly. See Abstract. U.S. Pat. No. 3,785,659 is incorporated herein by reference in its entirety.

U.S. Pat. No. 3,907,307 entitled "Packing Assembly," issued Sep. 23, 1975, and having for named inventors William C. Maurer, Joe K. Heilhecker, and Everett H. Lock, discloses an improved packing assembly for a reciprocating pump including front and rear packings, an intermediate lubricating ring, and means for preventing the forward extrusion of the rear packing past the lubricating ring. See Abstract. In a described preferred embodiment, the anti-extrusion means is provided by a backup ring designed to cooperate with the rear edge of the lantern ring. A pair of outwardly opening and rearwardly extending lip portions are formed in a rear edge portion of the lantern ring. The backup ring is adapted to mate with the rear edge of the lantern ring. U.S. Pat. No. 3,907,307 is incorporated herein by reference in its entirety.

U.S. Pat. No. 4,289,317 entitled "Pump Shaft Closure," issued Sep. 15, 1981, and having for named inventor Henry Kuc, discloses an improved stuffing box to effect an auxiliary static seal with a moveable shaft to allow replacement of packing elements. The stuffing box includes a sealing ring concentrically disposed around the shaft and means for mounting the sealing ring radially spaced apart from the shaft to permit lubricating fluid to flow between the sealing ring and the shaft during movement of the shaft. The stuffing box also includes a seal container axially moveable along the shaft for pressing the sealing ring radially against the shaft to form the static seal. See Abstract. U.S. Pat. No. 4,289,317 is incorporated herein by reference in its entirety.

U.S. Pat. No. 4,758,135 entitled "Pump Head," issued Jul. 19, 1988, and having for named inventors Michael J. Woodward and Robert S. Judson, discloses a pump and a stress and fatigue resistant pump head, one embodiment of which is useful for a high pressure pump and having a manifold, a valve cartridge, inlet and outlet valves in the valve cartridge, a pump fluid cylinder with a reciprocating plunger therein, a packing cartridge with packing for the plunger. The pump head may exhibit one or more of the following features: a. increased diameter packing cartridge; b. increased length front bushing; c. inclined inlet valve; d. inlet valve spring in valve cartridge on manifold side of valve; e. decreased diameter of high pressure seal of packing cartridge. See Abstract. U.S. Pat. No. 4,758,135 is incorporated herein by reference in its entirety.

U.S. Pat. No. 4,878,815 entitled "High Pressure Reciprocating Pump Apparatus," issued Nov. 7, 1989, and having for named inventor J. Edward Stachowiak discloses a high pressure reciprocating pump has a flange plate or mounting plate secured to the plunger end of a pump drive housing and a suction and discharge manifold is hingedly connected thereto. A stuffing box in bores in the flange plate has a central bore receiving one end of the plunger and forming a plunger pressure chamber coaxial with the plunger. A tapered packing assembly in the stuffing box surrounds the plunger in reciprocal sealing relation. A suction and discharge valve cartridge in one or more valve cavities in the manifold block is coaxial with the plunger. The hinged connection clamps the stuffing box in the flange plate for pivotal movement permitting clear access to the stuffing box and the valve cartridges whereby either may be removed as a unit for easy field maintenance. The valve cartridge comprises a common seat member with a suction valve and a discharge valve movably mounted thereon coaxial with the plunger and positioned concentric and radially spaced on the seat. When assembled, the valve cartridge is mechanically biased in the cavity by the stuffing box. The seat member has seals positioned to seal the cavity and the stuffing box around the pressure chamber. The seals are sized and positioned such that the valve cartridge is hydrostatically biased and urged toward the stuffing box by fluid pressure during operation of the pump plunger. See Abstract. U.S. Pat. No. 4,878,815 is incorporated herein by reference in its entirety.

U.S. Pat. No. 5,636,975 entitled "Inlet and Discharge Valve Arrangement for a High Pressure Pump," issued Jun. 10, 1997, and having for named inventors James C. Tiffany and William K. Morgan, discloses a high-pressure, plunger-type liquid pump including a liquid manifold that includes a plunger chamber in the form of an axial cylindrical bore portion for slidably receiving a pressurizing plunger, and that also includes a valve chamber coaxial with the plunger chamber and in communication therewith for removably receiving a cartridge-type flow control valve. The liquid manifold includes a closure plug to close the valve chamber. The cartridge-type valve is slidably received in the valve chamber for enabling removal of the cartridge-type valve from the liquid manifold without the need for separating the liquid manifold from the pump drive housing. The cartridge-type valve is of a structure that includes in-line, axially spaced suction and discharge valves that are each spring biased into closed positions. High-pressure liquid is confined within a valve housing body that contains the suction and discharge valves, to minimize damage to the liquid manifold as a result of pressure fluctuations and high-pressure flows. The cartridge-type valve is removable from the manifold without the necessity of removing or even separating the manifold from the pump drive housing. See Abstract. U.S. Pat. No. 5,636,975 is incorporated herein by reference in its entirety.

U.S. Pat. No. 5,716,055 entitled "Method of Making Packing Material Having Expanded Graphite Dispersed Throughout," issued Feb. 10, 1998, and having for named inventors Mark R. Wilkinson, Chester S. Hopper, Leslie K. Muir, and Michael S. Muir, discloses a minimum leakage packing system is provided for sealing pump shafts and the like. The packing is manufactured from twisted, exfoliated extruded, pultruded or split graphite material that is braided, twisted, laid up or otherwise combined to form mechanical packing. A lubricant and/or sealant may be applied to the finished packing. Graphite foil may be applied to the packing for enhanced properties. The packing system preferably consists of a precision wedge set and at least three rings including compressible graphite material, the rings compressed to different percentages of their original heights. The outside rings will have the most compression and the inner ring or rings of the multiring assembly the least. All should be compressed less than the maximum amount to permit high conformance to the surface being sealed. The system may have an optional gasket washer following the last ring of compressed graphite material. See Abstract. U.S. Pat. No. 5,716,055 is incorporated herein by reference in its entirety.

U.S. Pat. No. 5,845,909, entitled "Stuffing Box with Improved Packing Rings and Method," issued Dec. 8, 1998, and having for named inventors Lawrence F. Angelo, J. William Heathcott, and Stephen L. Witte, Sr., discloses a stuffing box 10, 60 designed for sealing engagement with a rod member R includes a plurality of stacked packing rings 32, 110, 150, 210, and a gland member 42, 64 axially moveable relative to the stuffing box body 12, 62 for varying the compressive force on the packing rings. Each packing ring comprises an annular rubber carrier 34, 112, 152, 212 having tapered upper and lower surfaces, and an annular plastic dynamic seal 36, 114, 154, 214 for sealing engagement with the rod member. Gland member 42, 64 exerts an axially compressive force on the radially exterior portion of each angularly wedged packing ring and thereby generates a radial inwardly directed biasing force on each plastic dynamic seal through the rubber carrier for sealing engagement of the dynamic seal with the rod member. Each packing ring includes an annular recess in at least one of the tapered upper and lower surfaces for thermal expansion of the rubber carrier, for flexing of the packing ring, and for increasing radial forces on the dynamic seal. See Abstract. U.S. Pat. No. 5,845,909 is incorporated herein by reference in its entirety.

U.S. Pat. No. 6,428,291 B1 entitled "Reciprocating Pump for a High Pressure Cleaning Appliance," issued Aug. 6, 2002, and having for named inventors Thomas Baerlin, Robert Nathan, and Joachim Daiss, discloses in the case of a reciprocating pump for a high pressure cleaning appliance including a pump housing in which there is disposed at least one pumping chamber having an inlet valve, an outlet valve and a reciprocating piston that projects thereinto in sealed manner, said pump housing comprising a pump block and a pump head which abut closely together at an interface, wherein the pumping chambers and/or the connecting conduits penetrate the interface in sealed manner and, in the region of the interface, accommodate inserts that are insertable into the pumping chambers and/or the connecting conduits from the interface, said inserts being fixed between the pump block and the pump head when in their inserted position, it is proposed that the whole construction be simplified by making the inserts themselves and the region of the pumping chambers and the connecting conduits in which the inserts are accommodated out of a thermally softenable synthetic material, and by connecting the inserts to the wall of the pumping chamber or the connecting conduit in which they are accommodated by means of a welded joint. See Abstract. U.S. Pat. No. 6,428,291B1 is incorporated herein by reference in its entirety.

As can be seen from the wide range of different efforts over many years represented by these patents, there has been a long-felt need for improved drive and gear systems for multifaced signs. While each of these prior art patents expands the prior art, and may provide certain advantages and benefits, the number of recent patents demonstrates the continued long-felt need for a reliable and cost-effective solution to the maintenance issues associated with the packing for positive-displacement pumps.

SUMMARY OF THE INVENTION

According to a first aspect of the invention, a packing cartridge is provided for use in a packing bore of a plunger-type pump, wherein the packing bore has a generally cylindrical interior wall and a seat. The packing cartridge comprises, without limitation, a generally cylindrical sleeve further comprising an outer cylindrical profile adapted to be at least partially positioned in the packing bore, a first abutment ring positioned in the sleeve, and a second abutment ring positioned in the sleeve and co-axially spaced apart from the first abutment ring. Telescoping structures are operatively positioned between the first abutment ring and the second abutment ring to allow for squeezing of the first abutment ring and the second abutment ring co-axially closer to one another. A retaining ring is operatively positioned between the telescoping structures to retain the telescoping structures together.

According to a second aspect of the invention, a packing cartridge is provided having, without limitation, a first element having: a first sleeve portion adapted to be positioned in at least a portion of the packing bore; and a first abutment ring positioned to extend inwardly and substantially circumferentially relative to the first sleeve portion. The packing cartridge further includes, without limitation, a second element comprising: a second sleeve portion having at least a portion thereof telescopically positioned in at least a portion of the first sleeve portion; and a second abutment ring positioned to extend inwardly and substantially circumferentially relative to the second sleeve portion. In a further aspect, the packing cartridge preferably further comprises a means for axially retaining the telescoping structures together.

A packing can be positioned in the sleeve between the first abutment ring and the second abutment ring. Preferably, the packing cartridge according to the various aspects of the invention further comprises a spacer ring operatively positioned to cover the overlapping travel of the telescoping structures. In a further aspect, the packing cartridge preferably further comprises a means for axially retaining the telescoping structures together.

According to yet another aspect of the invention, a packing cartridge is provided comprising: a sleeve adapted to be at least partially inserted into the packing bore; a structure forming a circumferential pressure-ring groove; and a pressure ring positioned in the pressure-ring groove. The pressure ring has at least one smaller external dimension than an internal dimension of the pressure-ring groove, whereby at least one clearance is provided between the pressure-ring groove and the pressure ring.

According to a still further aspect of the invention, methods of using a packing cartridge according to any of the various aspects the invention further comprises the steps of: inserting the packing cartridge at least partially into the packing bore; and releasably securing the packing cartridge in the packing bore.

According to yet a further aspect of the invention, a plunger-type pump is providing having the packing cartridge according to any of the aspects of the invention. Furthermore, a method of pumping a fluid from a low-pressure fluid source to a high-pressure fluid using the plunger-type pump is provided.

According to a still further and different aspect of the invention, a packing element is provided for use in a packing bore of a plunger-type pump. According to this aspect of the invention, the packing element comprises: a housing forming a circumferential pressure-ring groove; and a pressure ring positioned in the pressure-ring groove, the pressure ring having at least one smaller external dimension than an internal dimension of the pressure-ring groove, whereby at least one clearance is provided between the pressure-ring groove and the pressure ring.

The present invention allows a package cartridge to be adapted for use in the maintenance of a packing bore for a plunger-type pump without requiring removal of any existing stuffing box from the fluid end and without requiring removal of the fluid end from the power frame of the pump. These and other aspects and advantages of the invention will become apparent to persons skilled in the art from the following drawings and detailed description of presently most-preferred embodiments of the invention.

BRIEF DESCRIPTION OF THE DRAWING

The accompanying views of the drawing are incorporated into and form a part of the specification to illustrate several aspects and examples of the present invention, wherein like reference numbers refer to like parts throughout the figures of the drawing. These figures together with the description serve to explain the general principles of the invention. The figures are only for the purpose of illustrating preferred and alternative examples of how the various aspects of the invention can be made and used and are not to be construed as limiting the invention to only the illustrated and described examples. The various advantages and features of the various aspects of the present invention will be apparent from a consideration of the drawings.

FIG. 3a is a cross-sectional view of a packing cartridge according to the first aspect of the invention similar to the embodiment shown in FIG. 3, wherein at least one of the cooperating grooves for at least one of the snap rings is has a sufficient axial length to allow the associated abutment ring to telescope after assembly of the packing cartridge.

FIG. 7 is a cross-sectional view of another embodiment of a packing cartridge similar to the embodiment shown in FIG. 6, with the addition of: a retaining groove and an interference surface cooperatively positioned between the first and second sleeve portions; and a resilient ring positioned in the retaining groove for frictionally engaging the interference surface. When the resilient ring in the retaining groove is moved axially against the interference surface, the resilient ring frictionally engages the interference surface and resists separation of the first and second sleeve portions.

FIG. 7a is an enlarged detail view of a portion of FIG. 7, which illustrates the retaining groove, the interference surface, and the resilient ring positioned between the two. In contrast to the structures shown in FIGS. 5 and 5a, this embodiment illustrates the retaining groove is on the inner wall of the outer sleeve portion and the interference surface is on the outer wall of the inner sleeve portion.

FIG. 10a is an enlarged detail view of a portion of FIG. 10, which illustrates in more detail the spring sleeve portion that isolates and protects the coil spring from the reciprocating plunger.

FIG. 11 is a cross-sectional view of yet another embodiment of a packing cartridge generally similar to FIG. 5, with the addition of milled slots formed in the bottom of the sleeve to facilitate prying the cartridge out of the packing bore in case it becomes wedged.

FIG. 11a is a bottom end view of the packing cartridge shown in FIG. 11.

FIG. 17 is a cross-sectional view of a housing ring similar to the one illustrated in FIG. 16, which is illustrated as being included in an otherwise conventional packing set for a packing bore. The packing set is shown positioned in the packing bore of a pump.

DETAILED DESCRIPTION OF THE PRESENTLY MOST-PREFERRED EMBODIMENTS AND BEST MODES

Figure 1:
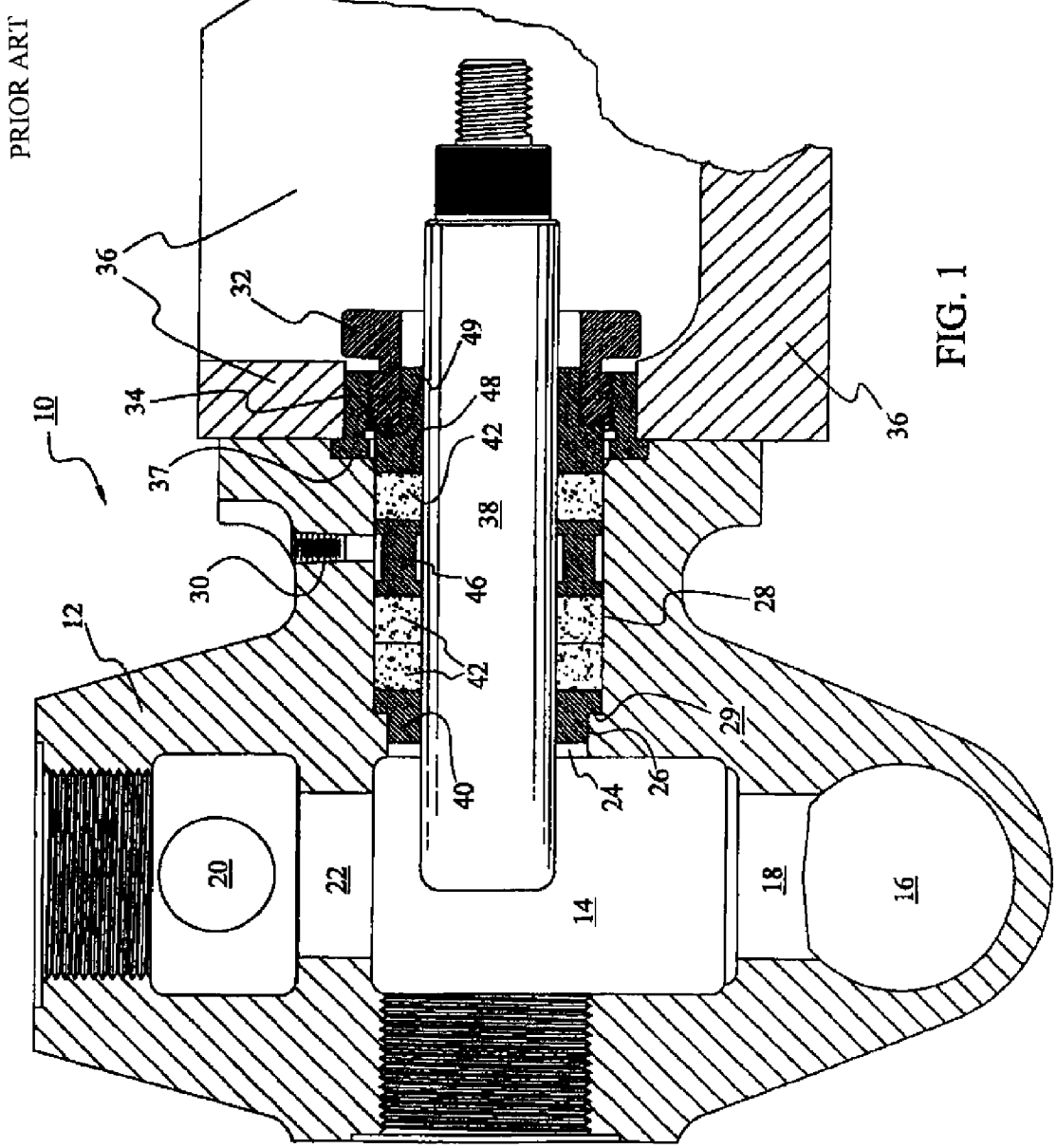
FIG. 1 is a cross-sectional view of a fluid end of a typical prior-art plunger-type pump known as the "323 Wheatley", illustrating that the fluid end defines a pumping chamber having a fluid intake port with a suction valve deck, a fluid discharge port with a discharge valve deck, and a cylindrical port with a packing bore and a plunger bore. A typical prior-art packing arrangement is illustrated in the packing bore, and a gland, such as a gland nut, for example, can be used to secure the packing and other parts in the packing bore and against the seat of the packing bore.

As defined herein, a "packing cartridge" is an apparatus that is adapted to be at least partially positioned in the packing bore of a plunger-type pump. As described below in more detail, the packing bore of the pump can be integrally formed in the fluid end or it can be provided by a stuffing box.

As used herein and in the appended claims, the words "comprise" and "include" and all grammatical variations thereof are each intended to have an open, non-limiting meaning that does not exclude additional elements or parts of an assembly, subassembly, or structural element.

As used herein, terms such as "first," "second," "third," etc. are arbitrarily assigned and are merely intended to differentiate between two or more parts that are similar or corresponding in structure and/or function. It is to be understood that the words "first" and "second" serve no other purpose and are not part of the name or description of the following terms. Furthermore, it is to be understood that that the mere use of the term "first" does not require that there be any "second" similar or corresponding part, either as part of the same element or as part of another element. Similarly, the mere use of the word "second" does not require that there by any "third" similar or corresponding part, either as part of the same element or as part of another element, etc.

As most of the parts of the packing cartridge are generally ring-shaped or cylindrical, the term "axial" refers to the geometrical axis of a part having a generally circular or cylindrical shape, such as a ring, packing bore, tubular sleeve, etc. The term "co-axial" means that the parts or elements are arranged to have aligned and co-extending geometrical axes. The term "co-axially spaced" means that the elements are positioned in a co-axial relationship but are spaced apart some distance measured along their common axis. The term "co-axially overlapping" means that the elements are positioned in a co-axial relationship and are overlapping in an axial direction.

Further, it is also to be understood that relative terms such as "top", "bottom", "length", "height", "width", "outward", "inward", "thickness", "depth", etc. are also arbitrarily assigned for convenient reference.

For example, certain terms are arbitrarily assigned with reference to the high-pressure and low-pressure sides of the packing cartridge. Thus, as used herein, "top" or "upper" means away from the high-pressure side of the packing and towards the low-pressure side. Similarly, "bottom" or "lower" means away from the low-pressure side of the packing and toward the high-pressure side of the packing.

Further, as used herein, "length", "height", and variations thereof will indicate a measurement in a direction parallel to the axial direction. As used herein, the terms ""outer", "outward", "inner" or "inward" and variations thereof will generally refer a radial direction perpendicular to the axial direction, where "outer" or "outward" refers to a direction extending radially outward or away from the geometrical axis and where "inner" or "inward" refers to a direction extending radially inward or toward the geometrical axis. In addition, the terms "thickness" and "depth" will generally refer to a radial measurement relative to a geometrical axis, such as the radially extending thickness of a ring or the radially extending depth of a groove.

Similarly, as most of parts of the packing cartridge are generally ring-shaped or cylindrical, structural features are defined in that context. For example, as used herein, the term "wall" generally refers to the body forming a circumferential surface parallel to a geometrical axis. In addition, the term "shoulder" refers to the body forming an annular surface that is perpendicular to the geometrical axis of the element. Accordingly, for example, a circumferential groove has a wall and two shoulders, i.e., an upper, downwardly facing shoulder and a lower, upwardly facing shoulder.

For the sake of consistency of usage, once a reference or relational term is arbitrarily assigned to help describe a structure or feature in a particular figure, the term will then be used consistently to refer to like parts throughout the other figures of the drawing. The same reference or relational term is later used even if the orientation of a structure is different in another figure. It is to be understood that, unless the context otherwise requires, the use of such arbitrarily assigned relational or relative terms is not to be construed as unnecessarily limiting the invention.

In general, unless otherwise expressly stated, the words or terms used in this disclosure and the claims are intended to have their ordinary meaning to persons of skill in the art. Initially, as a general aid to interpretation, the possible definitions of the words used herein are intended to be interpreted by reference to comprehensive general dictionaries of the English language published before or about the time of the earliest filing of this application for patent. Where several different general definitions are available, it is intended that the broadest definitions or senses be selected that are consistent with the description of the presently most-preferred embodiments of the invention, including without limitation as shown in the drawings.

After initially consulting such general dictionaries of the English language, it is intended that the words or compound terms be further defined or the most appropriate general definition or definitions be selected by consulting engineering dictionaries, encyclopedias, treatises, and relevant prior art to which this invention pertains. Finally, if necessary to resolve any remaining doubt, utilizing the patent record may be helpful to select from the possible definitions.

Of course, terms made up of more than one word (i.e., compound terms), such as "packing bore," may not be found in general dictionaries of the English language. Compound terms are intended to be interpreted as a whole, and not by parsing the separate words of the compound term, which might result in absurd and unintended interpretations. In general, compound terms are to be interpreted as they would be understood in the art, consistent with the usage in this specification and with reference to the drawings.

It is intended that examining relevant general dictionaries, encyclopedias, treatises, prior art, and the patent record will make it possible to ascertain the appropriate meanings that would be attributed to the words and terms of the description and claims by those skilled in the art, and the intended full breadth of the words and terms will be more accurately determined. In addition, the improper importation of unintended limitations from the written description into the claims will be more easily avoided.

Packing Bore Context of Typical Plunger-Type Pump

FIG. 1 is a cross-sectional view of a fluid end 10 of a typical prior-art plunger-type pump known as the "323 Wheatley". The fluid end 10 has a body 12 defining a pumping chamber 14 having a fluid intake port 16 with a suction valve deck 18, a fluid discharge port 20 with a discharge valve deck 22, and a cylindrical port 24 with a plunger bore 26, and a packing bore 28.

The packing bore 28 has a larger diameter than the plunger bore, so that the packing bore is adapted for accommodating packing between the interior cylindrical wall of the packing bore and the outward cylindrical surface of the plunger. The packing bore 28 has a seat 29 adjacent the high-pressure end thereof. The seat 29 is generally annular in shape, presenting an annular surface generally facing the low-pressure end of the packing bore 28, which is away from the plunger bore 26. The annular surface of the seat 29 is preferably at a substantially perpendicular angle relative to the axis of the interior wall of the packing bore, but it can be at an oblique angle. The central opening in the seat 29 allows for insertion of the plunger through seat. The seat 29 of the packing bore 28 can be formed as a shoulder between the interior wall of the packing bore 28 and the plunger bore 26.

In this example, the fluid end has a lubrication port 30 integrally formed in the fluid-end body for delivering a lubricating fluid directly into the packing bore 28. This is sometimes referred to as a fluid end having internal lubrication.

A typical prior-art packing arrangement is illustrated in the packing bore 28, and a gland, such as a gland nut 32, for example, can be used to secure the packing and other parts in the packing bore and against the seat of the packing bore.

In this example, the gland nut 32 has a threaded portion that is screwed into a correspondingly threaded portion of a gland adapter 34. A flange portion 37 of the gland adapter 34 is captured between the fluid-end body 12 and the power frame 36 by the attachment of the fluid end 12 to the end of the power frame 36 (partially shown) of the power end (not shown). The glad adapter 34 acts as a line up boss for the fluid-end body 12 on the power frame 36. The fluid-end body 12 has a plurality of studs (not shown) that go through the power frame 36 that bolts the two together. The power frame 36 of the power end (not shown) is held in a substantially permanent, stationary position. The fluid-end body 12 is typically bolted to the power frame 36 and is cradled by the power frame 36. The fluid-end body 12 is not unbolted and disconnected from the power frame 36 except for major maintenance overhaul of the fluid end.

The plunger 38 of the pump is positioned to reciprocate back and forth in the cylindrical port 24 of the pumping chamber 14, including through the plunger bore 26 and the packing bore 28, and also through an opening in gland nut 32. The cylindrical port 24 is formed in the heavy-walled fluid-end body 10. The heavy-walled cylindrical port 24 is designed to structurally withstand the high-reciprocating and high-pressure forces to accommodate the plunger 38.

Typical packing set elements that can be used in a packing bore 28, include, for example, a bottom abutment ring 40, a plurality of packing rings 42, a lantern ring 46, and an upper abutment ring 48. The upper abutment ring 48 has a shoulder portion 49 that can be axially compressed by the gland nut 32. It is important not to over-tighten the gland nut 32, however, or the packing will be over-tightened against the plunger 38, causing excessive friction wear and even breakage of the plunger 38.

Routine maintenance of the packing bore 28 is a tedious process. Typical maintenance, involves, for example, the steps of removing the gland nut 32, removing the plunger 38, removing the various existing packing set elements from the packing bore 28, replacing the packing rings and replacing or cleaning certain other packing elements of the packing set, reassembling the packing set elements in the packing bore 28, re-insertion of the plunger 38, and proper tightening of the gland nut 32. The access to the packing bore 28 is often inconvenient and the working conditions for these tasks are often outdoors and difficult.

Figure 2:
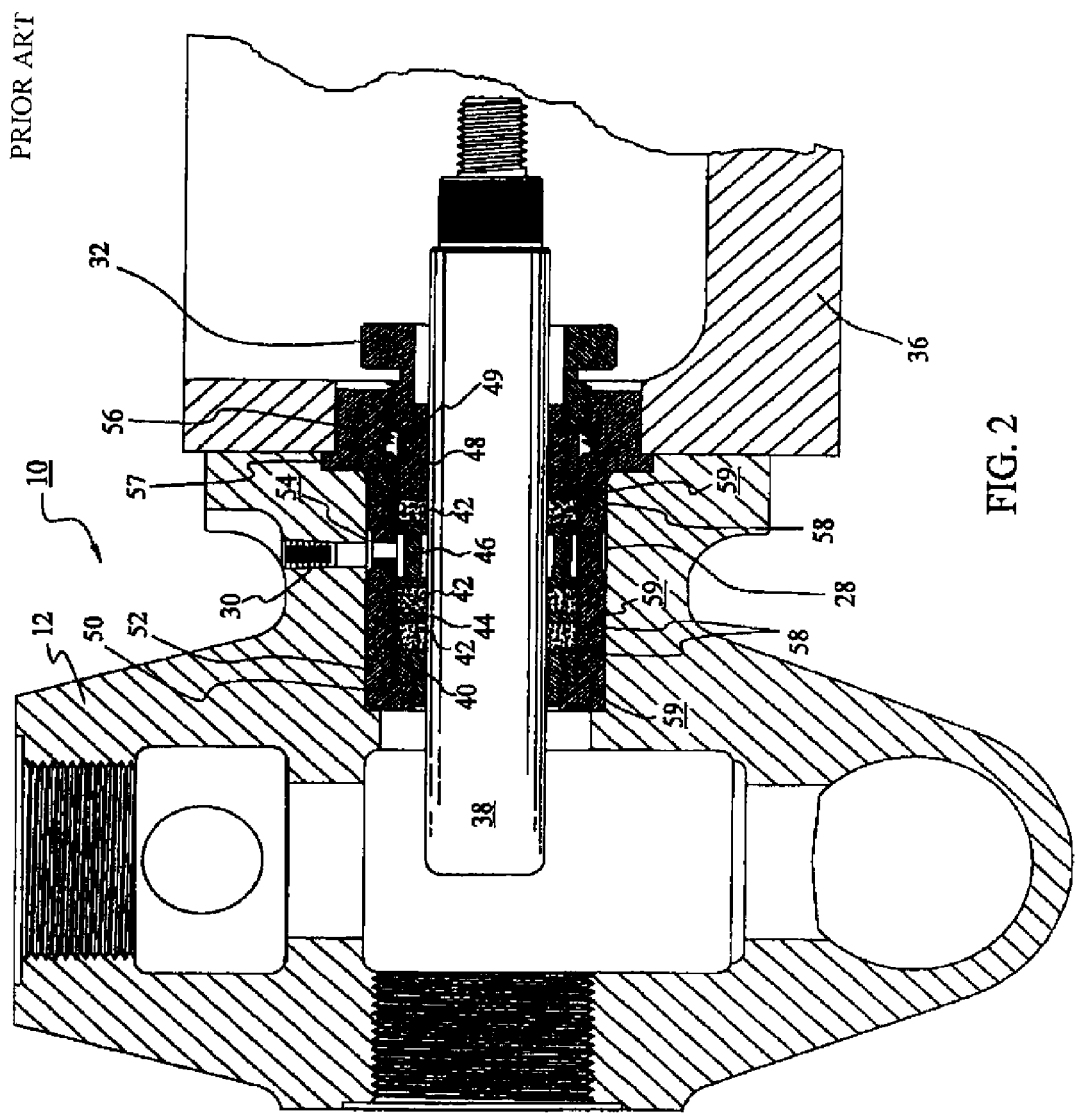
FIG. 2 is a cross-sectional view of a fluid end and power-frame attachment of a typical prior-art plunger-type pump known as the "323 Wheatley", "similar to that shown in FIG. 1, illustrating a prior-art stuffing box that is permanently secured in the cylindrical port unless the fluid end is removed from the power frame. In this case, the stuffing box provides the packing bore.

FIG. 2 is a cross-sectional view of a fluid end 10 and power-frame attachment of a typical prior-art plunger-type pump known as the "323 Wheatley", generally similar to that shown in FIG. 1, illustrating a prior-art stuffing box 50 that is permanently secured in a stuffing-box bore 52 formed in the fluid-end body 12. In this case, the stuffing box 50 provides the packing bore 28. The stuffing box 50 cannot be removed unless the fluid-end body 12 is removed from the power frame 36 (partially shown), In this example of FIG. 2, the fluid end 10 has a lubrication port 30 integrally formed in the fluid-end body 12 for delivering a lubricating fluid directly into the packing bore 28. To accommodate the lubrication port 30, the stuffing box 50 can have an integrally formed lantern-ring portion 54.

The stuffing box 50 has an integrally formed glad-adapter portion 56. A flange portion 57 of the gland adapter portion 56 is captured between the fluid-end body 12 and the power frame 36 by the attachment of the fluid end 12 to the end of the power frame 36 (partially shown) of the power end (not shown). The gland nut 32 has a threaded connection to the gland-adapter portion 56. In this example, gland-adapter portion 56 of the stuffing box 50 also acts as a line up boss for the fluid-end body 12 on the power frame 36. Similar to the previous example, the fluid-end body 12 has a plurality of studs (not shown) that go through the power frame 36 that bolts the two together. The power frame 36 of the power end (not shown) is held in a substantially permanent, stationary position. The fluid end 10 is typically bolted to the power frame 36 and is cradled by the power frame 36. The fluid-end body 10 is not unbolted and disconnected from the power frame 36 except for major maintenance overhaul of the fluid end. Thus, this type of stuffing box 50 is not removed from the fluid end for routine maintenance of the packing bore 28.

A plurality of o-ring seals 58 are positioned in o-ring retaining grooves 59 in the outer wall of the stuffing box 50. The o-ring seals 58 help prevent fluid leakage around the stuffing box 50 and from the internal lubrication provided by the internal lubrication port 30 and the lantern-ring portion 54.

Typical packing set elements that can be used in the packing bore 28 of stuffing box 50 are the same as for any other packing bore, including, for example, as illustrated in FIG. 2, a bottom abutment ring 40, a plurality of packing rings 42, one or more back-up rings 44, a lantern ring 46, and an upper abutment ring 48. The upper abutment ring 48 has a shoulder portion 49 that can be axially compressed by the gland nut 32. It is important not to over-tighten the gland nut 32, however, or the packing will be over-tightened against the plunger 38, causing excessive friction wear and even breakage of the plunger 38.

Routine maintenance of the packing bore 28 of this type of stuffing box 50 is the same type of tedious and difficult process as for a packing bore integrally formed in the fluid-end body 12. Typical maintenance, involves, for example, the steps of removing the gland nut 32, removing the plunger 38, removing the various existing packing set elements from the packing bore 28, replacing the packing rings and replacing or cleaning certain other packing elements, reassembling the packing set elements in the packing bore 28, re-insertion of the plunger 38, and proper tightening of the gland nut 32. The access to the packing bore 28 is often inconvenient and the working conditions for these tasks are often outdoors and difficult.

Similarly, even for a stuffing box design that is adapted to be bolted to the fluid-end body without requiring removal of the fluid-end body from the power frame, many of the same difficulties are presented in the routine maintenance of the packing bore. For example, such a stuffing box design must be a heavy-walled body with sufficient structure to contain and withstand the forces of the reciprocating plunger in the stuffing box. Essentially, such a stuffing box design is merely a non-integrally formed fluid end body for providing a packing bore.

Packing Cartridge Embodiments for Use in a Packing Bore

According to certain aspects of the invention, various packing cartridges are provided for the packing bore. According to certain aspects of the invention, a self-contained, replaceable packing cartridge can be adapted to replace pre-existing packing stacks for a plunger-type pump.

The packing cartridges according to the invention are not required to be permanently mounted in the fluid end of the pump by any portion of the power frame. In addition, these packing cartridges can be used as a replaceable packing bore insert, aiding in convenience and reducing the expense relative to maintaining the packing and reconditioning the packing bore formed in a fluid-end body or existing stuffing box. The packing cartridges can be used to replace old packing set elements with a pre-assembled cartridge instead of taking the time to tediously replace parts and pieces of conventional packing, out in the field and sometimes in hard to reach access to the packing bore. In addition, some of the packing cartridges according to the invention can be used to provide a predetermined packing crush pressure to the packing.

In general, each packing cartridge has a sleeve with a major outer diameter that rides in an original packing bore of the fluid-end body or stuffing box. The sleeve also has an internal bore that acts as a new packing bore. Preferably, the sleeve is a relatively thin-walled structure, which is supported within the relatively heavy-walled structure provided by the original packing bore of the pump, either as part of the fluid-end body or a stuffing box. This sleeve provides a bore that is similar to the original packing bore, except that it does not have the relatively massive body structure of the fluid end required to support a reciprocating plunger therein. The thickness of the sleeve of the packing cartridge can be made thinner or thicker, however, to allow for changing the size of the plunger in the packing bore. The sleeve relies on the structural support of the original packing bore. Because of the wall thickness of the sleeve in the packing bore of the fluid end body, the internal packing bore provided by the sleeve is somewhat smaller in internal diameter of the original packing bore.

In certain applications, because the internal bore of the packing cartridge is smaller than that of the original packing bore, the cross-section of the packing used in the cartridge is smaller than the original packing using in the original packing bore in order to accommodate the original plunger. Alternatively, using a larger or smaller cross-section packing material, plunger diameters can be increased or decreased. This allows for easily adjusting the pump for use of higher pumping pressures, at lower pumping volume, or lower pumping pressures, at higher pumping volumes.

Telescoping structures are operatively positioned between a first abutment ring and a second abutment ring to allow for squeezing of the first abutment ring and the second abutment ring co-axially closer to one another. The telescoping structures are preferably free to rotate relative to one another as the abutment rings are axially squeezed together to apply the appropriate squeeze to the packing elements and other elements that can be positioned there between.

The squeezing of the telescoping structures is preferably provided by capturing the packing cartridge in the packing bore between the seat 29 of the packing bore 28 and a gland, such as gland nut 32. The fluid-end body 12 is rigidly held in place by the power frame 36 of the pump and a gland, such as gland nut 32, can be threaded or otherwise bolted to the fluid-end body 12. Thus, there is no need to hold or prevent the packing cartridge from rotating about its axis to apply axial squeezing to the packing therein.

Furthermore, the telescoping elements allow the packing to remain in a relaxed condition until a plunger in inserted through the packing cartridge and the packing cartridge is positioned in the packing bore 28. This is important because if the packing is squeezed or compressed prior to inserting a plunger through the packing, it would be much more difficult to insert the plunger through the packing. Thus, according to certain aspects of the invention, packing cartridges are provided that allow the packing stack to be held in a pre-assembled but relaxed condition prior to being positioned in the packing bore. Then, the packing cartridges can preferably be axially compressed in the packing bore on the plunger and between the seat of the packing bore and a gland. The gland is preferably used to transfer rotational force to axial, compressing force on the telescoping elements of the packing cartridge in the packing bore.

According to a further aspect, a spring-loaded, self-adjusting packing set can be used in the packing cartridges, which can then be used in original packing bores that are not designed for spring-loaded applications. According to this aspect of the invention, the packing cartridge allows for the self-adjustment of the packing using factory specifications for plunger bores. Otherwise, the adjustment of the compression on the packing in conventional plunger-type pumps requires the tightening of a gland, such as a cap or flange, to set pressures on the packing. If the packing is too tight or too loose, failure can occur. A cap or flange that is too tight can cause too much interference on the plunger causing it to heat up, lock up or tear apart causing a great amount of damage. A cap or flange that is too loose will cause possible leakage. The packing cartridge can provide the ability to use spring-loaded packing in pumps utilizing existing factory specifications.

According to the various aspects of the invention, packing cartridge can consist of a number of parts and pieces in each unit. For example, the packing cartridge can consist of only a few pieces per unit or a complex pre-assembled cartridge having thirty pieces per unit, or even more, if desired.

In general, the sleeve and the abutment structures are preferably made of strong structural material, and are preferably made of metal, such as stainless steel, alloy, or aluminum bronze. Other structural elements, such as lantern rings, spacer rings, coil or wave springs, etc., also are made of preferably made of metal. For corrosion resistance and other purposes, however, it is contemplated that certain parts could be made of ceramic or plastic, depending on the necessary physical and chemical properties of the structure.

Further, o-rings are preferably made of a resilient material, such as neoprene. Traditional or non-traditional materials can be used for the packing elements, as will hereinafter be described in more detail.

As illustrated by the following examples and embodiments and as will be further appreciated by those skilled in the art upon reading this disclosure, the packing cartridges according to the various aspects of the invention can encompass many different configurations.

Figure 3:
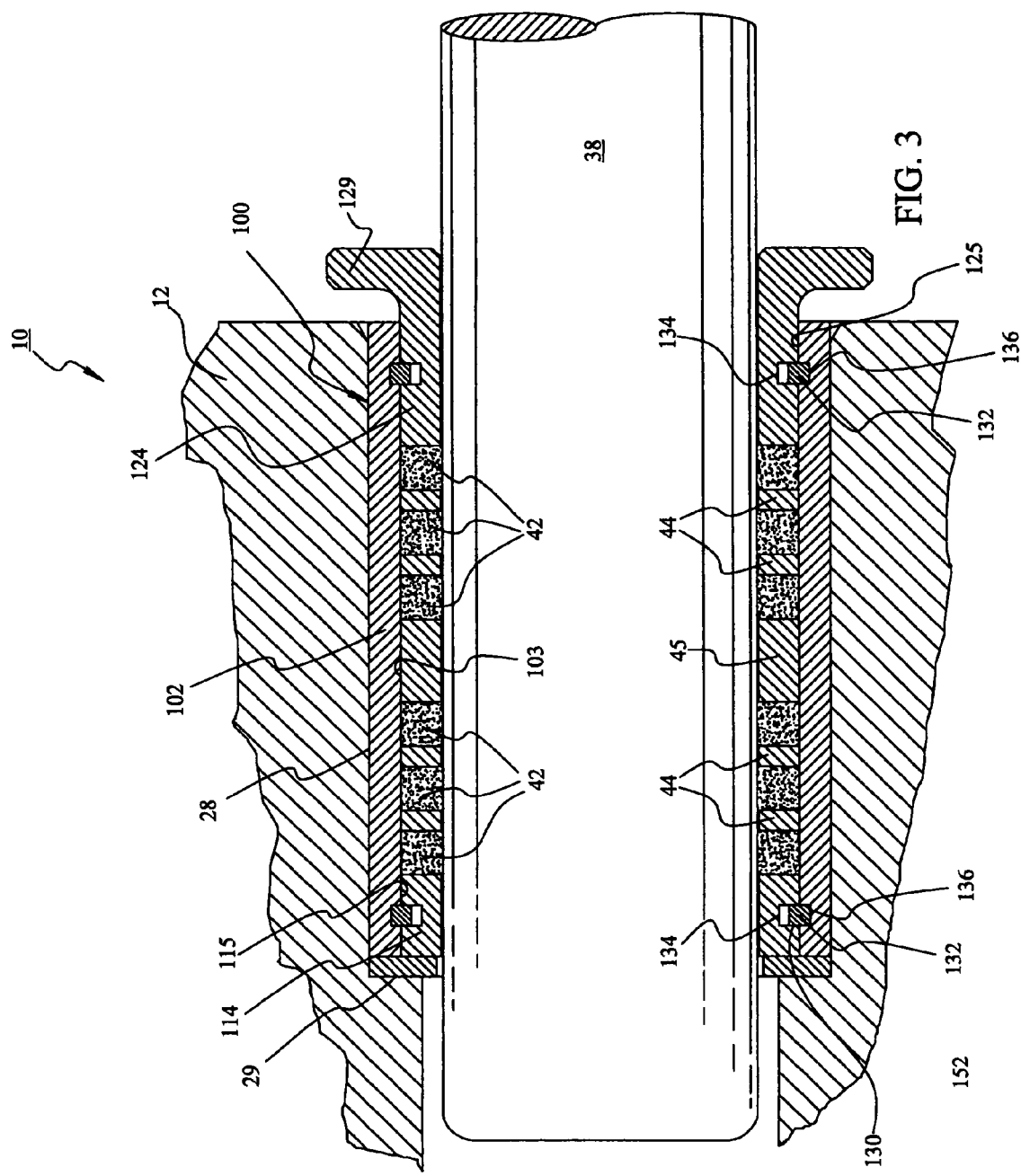
FIG. 3 is a cross-sectional view of a simplified embodiment of a packing cartridge according to a first aspect of the invention. The packing cartridge is shown positioned in a packing bore of a pump. The packing cartridge comprises a sleeve having an outer cylindrical profile adapted to be at least partially positioned in the packing bore, a first abutment ring positioned in the sleeve, and a second abutment ring positioned in the sleeve and co-axially spaced apart from the first abutment ring. According to this embodiment, each of the first abutment ring and the second abutment ring telescope to be positioned in the sleeve and each is then retained in position by a snap-ring in cooperating grooves.

FIG. 3 is a cross-sectional view of a simplified embodiment of a packing cartridge 100 according to a first aspect of the invention. The packing cartridge 100 is illustrated in the packing bore 28 and a plunger 38 is shown positioned through the packing cartridge 100.

The packing cartridge 100 comprises a sleeve 102 having an outer cylindrical profile adapted to be at least partially positioned in a packing bore 28, a first abutment ring 114 positioned in the sleeve, and a second abutment ring 124 positioned in the sleeve 102 and co-axially spaced apart from the first abutment ring 114. The abutment rings 114 and 124 are ring-shaped structures that provide abutments between which various packing elements 42, back up rings 44, a spacer ring 45, and any other desirable pieces of a packing stack that can be positioned in the sleeve 102.

Preferably, the second abutment ring 124 is integrally formed with a flange portion 129, which can be engaged by a gland nut (not shown) to axially compress the packing cartridge 100 in the packing bore 28. More preferably, the flange portion 129 is spaced apart from the fluid end body 12, which allows for prying the cartridge 100 out of the packing bore 28.

According to this embodiment shown in FIG. 3, the sleeve 102 has an inside circumferential surface 103 in which packing elements can be inserted telescopically and positioned. Each of the first abutment ring 114 and the second abutment ring 124 have an outer circumferential surface 115 and 125, respectively, that has an outside diameter adapted to be telescopically inserted and positioned in the inside circumferential surface 103 of the sleeve 102.

Each of the first and second abutment rings 114 and 124 can be retained in operative position in the sleeve 102. As shown in FIG. 3, a snap ring 132 is positioned in cooperating grooves 134 and 136. For example, a snap-ring receiving groove 134 is formed in the outwardly facing wall of each of the first abutment ring 114. A corresponding snap-ring engaging groove 136 is formed in the inwardly facing wall of the sleeve 102, which is described in detail. A similar snap-ring 132 is positioned in similar cooperating grooves 134 and 136 formed in the second abutment ring 124.

The snap ring 132 is a typical split ring made of a material having a relatively a high tensile strength and having moderately resilient properties, such as metal or plastic. A snap ring has a naturally relaxed diameter, but because of a gap formed between two adjacent ends when the ring is in a relaxed condition, it can be circumferentially compressed to a slightly smaller diameter.

This snap-ring receiving groove 134 is sufficiently deep to accommodate at least a portion of the snap ring 132 when it is in an at least partially compressed condition. When the snap ring 132 is in a compressed condition in the snap-ring retaining groove 134 of the first abutment ring 114, the compressed outside diameter of the snap ring 132 can telescopically slide into the inside diameter of the sleeve 102. As the first abutment ring 114 is telescopically moved in the sleeve 102, it can be allowed to partially relax, but is still at least partially circumferentially compressed by inwardly facing wall of the sleeve 102. The upper and lower shoulders of the snap-ring retaining groove 134 axially capture the snap ring 132 and force it to move telescopically with the first abutment ring 114 as the abutment ring is moved telescopically in the sleeve 102.

The snap-ring engaging groove 136 is sufficiently deep to accommodate at least a portion of the snap ring 132 when the snap ring 132 is in an at least partially relaxed condition. When the snap ring 132 is moved by the first abutment ring 114 into an axially overlapping relationship with the corresponding snap-ring engaging groove 136 formed in the inwardly facing wall of the sleeve 102, the snap ring 132 can at least partially relax by radially expanding ("snapping") into the snap-ring engaging groove 136.

When the snap ring 132 expands into the snap-ring engaging groove, in addition to still being axially captured between the upper and lower shoulders of the snap-ring retaining groove 134, it also becomes axially captured between the upper and lower shoulders of the snap-ring engaging groove 136. This prevents separation of the telescoping structures without severely distorting and probably destroying the snap ring 132, and probably the telescoping structure as well.

If desired, a sealing ring 152 can be positioned between the seat 29 of the packing bore 28 and the packing cartridge 100. A seal ring 152 helps prevent fluid from entering any clearance between the outside wall of the sleeve 102 and the inside wall of the packing bore 28. Such a sealing ring preferably has elastic properties with a relatively high minimum yield and can have relatively low tensile strength. The sealing ring 152 can be formed, for example, of a rubber or rubber-like material.

Various packing elements, such as packing rings 42, back-up rings 44, and spacer ring 45 can be positioned as desired in the sleeve 102 between the first and second abutment rings 114 and 124. If desired, other elements (not shown in FIG. 3), such as a lantern ring or a spring, can also be positioned between the first and second abutment rings, as will hereinafter be described in detail with respect to other aspects and embodiments of the invention.

This particular packing cartridge 100 is not, however, adapted to be completely pre-assembled prior to positioning on a plunger and installed in the packing bore 28. This is because in this particular embodiment, the snap rings 132 between the first and second abutment rings 114 and 124, respectively, do not allow for squeezing of the first abutment ring and the second abutment ring co-axially closer to one another after positioning the packing cartridge 100 in the packing bore 28. Nevertheless, this packing cartridge 100 does allow for at least partial pre-assembly of the packing cartridge prior to use in the field.

For example, the packing cartridge 100 can be advantageously used according to a first aspect of the invention by partially pre-assembly the first abutment ring 114 snapped into position in the sleeve 102, followed by stacking the desired packing assembly, such as packing rings 42 and back-up rings 44. In the field, a plunger 38 can be inserted through the partially assembled packing cartridge 100 or the packing cartridge can be completely assembled on the plunger, as desired. If desired, a seal ring 152 can be positioned against the seat 29 of the packing bore. The plunger and packing cartridge 100 thereon can then be positioned in the packing bore 28. The gland nut 32 can next be tightened against the packing cartridge 100 to axially compress the packing cartridge 100 between the seat 29 of the packing bore 28 and the gland nut 32. This pushes the second abutment ring 124 toward the first abutment ring 114 and compresses the packing stack 42, 44, 45 on the plunger. At a predetermined position, the snap ring 132 of the second abutment ring 124 will snap into the snap-ring retaining groove 136. The predetermined position when the second abutment ring 114 snaps into place can be designed to indicate or provide the desired initial compression on the packing rings 42. This helps prevent over-tightening of the packing stack.

The advantage of using telescoping structures is that it allows a gland nut to squeeze the abutment rings 114 and 124 together after insertion of the packing cartridge 100 into the packing bore 28.

This particular embodiment of a packing cartridge 100 as shown in FIG. 3 does not allow for further compression or tightening of the packing rings 42 between the first and second abutment rings 114 and 124. Other and further aspects and embodiments of the invention provide other and further advantages. For example, the packing assembly can be provided with a spring (not shown) in the sleeve 102 to help maintain a constant compression on the packing rings 42 to compensate for wearing of the packing rings 42.

FIG. 3a is a cross-sectional view of a packing cartridge 100a according to the first aspect of the invention similar to the embodiment shown in FIG. 3. This embodiment is similar in all respects to the embodiment shown in FIG. 3, except that at least one of the cooperating grooves for at least one of the snap rings is has a sufficient axial length to allow the associated abutment ring to telescope after assembly of the packing cartridge.

Preferably, as shown in FIG. 3a, adjacent the second abutment ring 124, which in this example is near the upper end of the sleeve 100a, the snap-ring engaging groove 136a is relatively wide, allowing the snap ring 132 to ride telescopically between the shoulders of the snap-ring engaging groove 136a.

This provides a marked advantage, in that the packing cartridge 100a can be preassembled without axially squeezing the packing stack 42, 44, 45 between the abutment rings 114 and 124. It also allows for squeezing of the first abutment ring 114 and the second abutment ring 124 co-axially closer to one another after positioning the packing cartridge 100a in the packing bore 28.

For example, the packing cartridge 100a can be advantageously used according to a first aspect of the invention by complete pre-assembly of the first abutment ring 114 snapped into position in the sleeve 102, followed by stacking the desired packing assembly, such as packing rings 42 and back-up rings 44, then followed by the second abutment ring 124 snapped into position in the sleeve. The wider groove 136a allows for preassembly without squeezing the packing rings 42 in the packing stack. In the field, a plunger 38 can be inserted through the completely assembled packing cartridge 100a. If desired, a seal ring 152 can be positioned against the seat 29 of the packing bore. The plunger 38 and packing cartridge 100a thereon can then be positioned in the packing bore 28. The gland nut 32 can next be tightened over the packing cartridge 100a to axially compress the packing cartridge 100a between the seat 29 of the packing bore 28 and the gland nut 32. This pushes the second abutment ring 124 toward the first abutment ring 114 and compresses the packing stack 42, 44, 45 on the plunger. The gland nut 32 is tightened to the initial specifications of the packing stack of the packing cartridge 100a. As the packing wears and is crushed, the gland nut 32 can be further tightened to maintain proper axial compression on the packing stack.

Other and further aspects and embodiments of the invention provide other and further advantages. For example, the packing cartridge 100a can be provided with a spring (not shown) in the sleeve 102 to help maintain a constant compression on the packing rings 42 to compensate for wearing of the packing rings 42.

Figure 4:
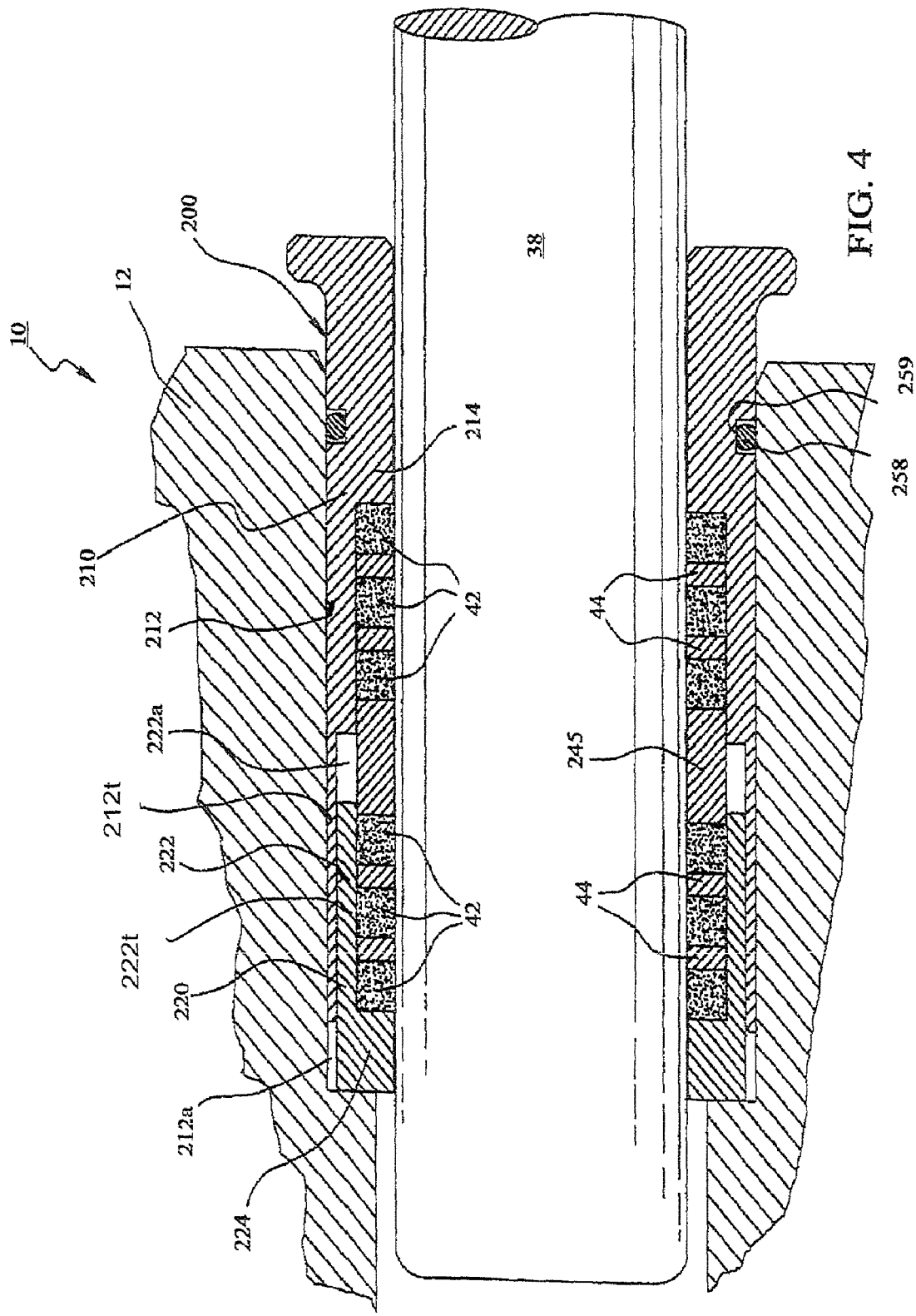
FIG. 4 is a cross-sectional view of another embodiment of a packing cartridge according to second aspect of the invention. The packing cartridge is shown positioned in the packing bore of a pump. The packing cartridge includes a first element comprising a first sleeve portion adapted to be positioned in at least a portion of the packing bore, and a first abutment ring positioned to extend inwardly and substantially circumferentially relative to the first sleeve portion. The packing cartridge further includes, without limitation, a second element comprising a second sleeve portion having at least a portion thereof telescopically positioned in at least a portion of the first sleeve portion, and a second abutment ring positioned to extend inwardly and substantially circumferentially relative to the second sleeve portion. Preferably, a spacer ring is operatively positioned to cover the overlapping travel of the telescoping structures between the first and second sleeve portions.

FIG. 4 is a cross-sectional view of another embodiment of a packing cartridge 200 according to second aspect of the invention. The packing cartridge 200 is illustrated in the packing bore 28 of a pump. The packing cartridge 200 includes a first element 210 comprising a first sleeve portion 212 adapted to be positioned in at least a portion of the packing bore 28, and a first abutment ring 214 positioned to extend inwardly and substantially circumferentially relative to the first sleeve portion 212. The packing cartridge 200 further includes, without limitation, a second element 220 comprising a second sleeve portion 222 having at least a portion thereof telescopically positioned in at least a portion of the first sleeve portion 212, and a second abutment ring 224 positioned to extend inwardly and substantially circumferentially relative to the second sleeve portion 222. As shown in FIG. 4, the first abutment ring 214 is integrally formed with the first sleeve portion 212 and the second abutment ring 224 is integrally formed with the second sleeve portion 222. It is to be understood, of course, that if desired the first sleeve portion 212 can alternatively be designed to telescope in the second sleeve portion 222.

As will be appreciated, the telescoping structures 212t and 222t of the first sleeve portion 212 and the second sleeve portion 222 allow for squeezing of the first abutment ring 214 and the second abutment ring 224 co-axially closer to one another after positioning the pre-assembled packing cartridge 200 on a plunger 38 in the packing bore 28. This axial squeezing is initially provided by the gland nut 32 (not shown in FIG. 4). The gland nut initially can be tightened to the specifications of the packing elements 42. In addition, from time to time, the gland nut can be tightened further to further squeeze the packing elements 42 in compensation for wear during operation of the pump. Preferably, these telescoping structures 212t and 222t allow for at least sufficient overlapping travel in areas 212a and 222a to allow for the expected crushing of packing during the operation of a plunger 38 though the packing cartridge 200. For example, the expected crush of the packing rings may be about 0.4 inches.

Preferably, a spacer ring 245 is positioned operatively to cover the overlapping travel of inwardly exposed area 222a of the telescoping structures 212t and 222t between the first and second sleeve portions 210 and 220. This spacer ring 245 helps prevent seepage of fluid into any clearances between the first sleeve portion 210 and the second sleeve portion 220. The spacer ring 245 can also act as a back-up ring for the packing rings 42.

If desired, a sealing ring 258 can be positioned in a sealing ring groove 259 in the outer wall of the first element 210 between the packing cartridge 200 and the packing bore 28. Such a sealing ring 258 preferably has elastic properties with a relatively high minimum yield and can have relatively low tensile strength. The sealing ring 258 can be formed, for example, of a neoprene or rubber-like material.

The packing cartridge 200 is adapted to be completely pre-assembled prior to positioning on a plunger and installed in the packing bore 28. The telescoping structures allow for squeezing of the first abutment ring 214 and the second abutment ring 224 co-axially closer to one another after positioning the packing cartridge 200 in the packing bore 28. Of course, while this packing cartridge 200 does allow for pre-assembly of the packing cartridge prior to use in the field, it can be assembled in the field, if desired.

For example, the packing cartridge 200 can be advantageously used according to an aspect of the invention by completely pre-assembling the cartridge prior to taking it to the field for installation in a pump. In the field, a plunger can be inserted through the pre-assembled packing cartridge 200. The plunger and packing cartridge 200 thereon can then be positioned in the packing bore 28. A gland nut (not shown) can next be tightened over the packing cartridge 200 to axially compress the packing cartridge 200 between the seat 29 of the packing bore 28 and the gland nut. This squeezes the first element 210 toward the second element 220 and compresses the packing stack 42, 44 on the plunger.

Preferably, this embodiment of a packing cartridge 200 as shown in FIG. 4 allows for further compression or tightening of the packing rings 42 between the first and second abutment rings 214 and 224. According to the example of this embodiment, the telescoping structures have at least sufficient overlapping travel to allow for the expected crushing of packing during the operation of a plunger though the packing cartridge 200. Other and further aspects and embodiments of the invention provide other and further advantages. For example, the packing stack can be provided with a spring (not shown) to help maintain a constant compression on the various packing elements of the packing stack to compensate for wearing of the packing rings 42.

Figure 5:
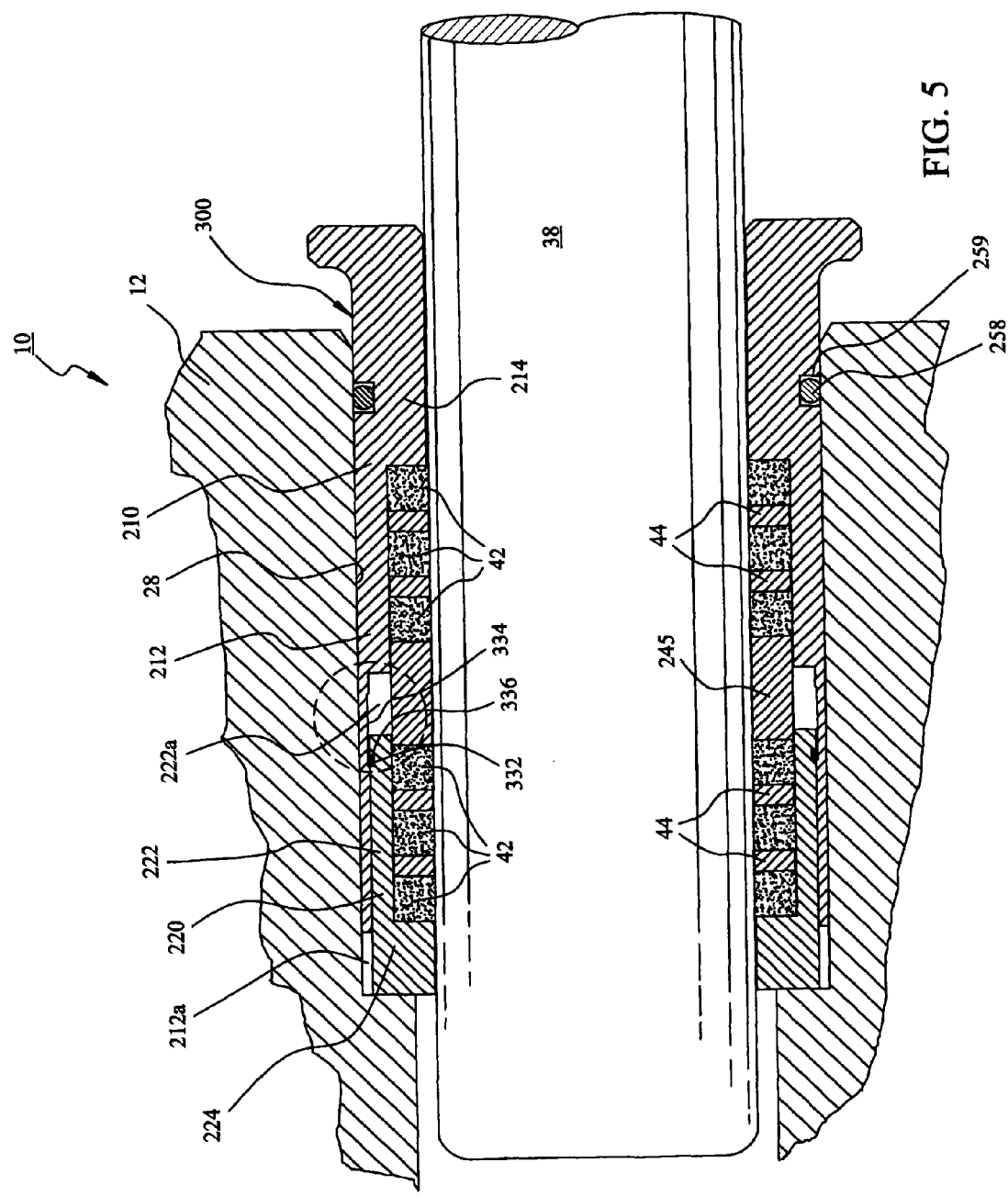
FIG. 5 is a cross-sectional view of another embodiment of a, packing cartridge similar to the embodiment shown in FIG. 4, with the addition of: a retaining groove and an interference surface cooperatively positioned between the first and second sleeve portions; and a resilient ring positioned in the retaining groove for frictionally engaging the interference surface. When the resilient ring in the retaining groove is moved axially against the interference surface, the resilient ring frictionally engages the interference surface and resists separation of the first and second sleeve portions.
Figure 5A:
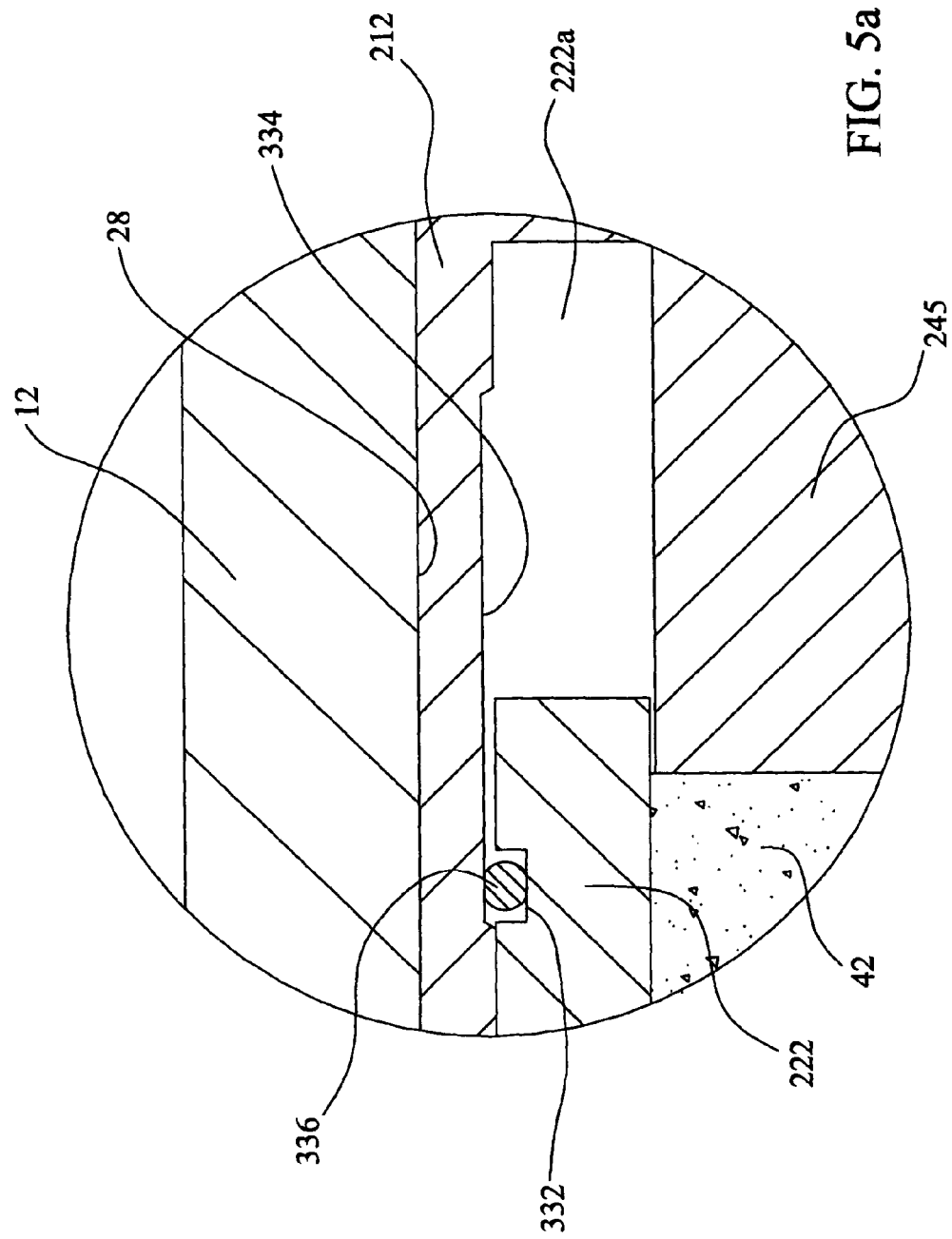
FIG. 5a is an enlarged detail view of a portion of FIG. 5, which illustrates the retaining groove, the interference surface, and the resilient ring positioned between the two. In this embodiment, the retaining groove is on the outer wall of the inner sleeve portion and the interference surface is on the inner wall of the outer sleeve portion.

FIG. 5 is a cross-sectional view of another embodiment of a packing cartridge 300 similar in all material respects to the embodiment shown in FIG. 4, with the addition of a presently most preferred embodiment of a means for retaining the telescoping structures together. FIG. 5a is an enlarged detail view of a portion of FIG. 5, which best illustrates an o-ring retaining groove 332 and an o-ring interference surface 334 cooperatively positioned between the first and second sleeve portions; and a resilient o-ring 336 positioned in the retaining groove 332 for frictionally engaging the interference surface 334. In this embodiment, the retaining groove is on the outer wall of the inner sleeve portion and the interference surface is on the inner wall of the outer sleeve portion.

When the resilient ring 336 in the retaining groove 332 is moved axially against the interference surface 334, the resilient ring 336 frictionally engages the interference surface 334 and resists separation of the first and second sleeve portions 212 and 222, and consequently, the first and second elements 210 and 220. Preferably, a sufficient clearance is provided between the telescoping surfaces of the first sleeve portion 212 and the second sleeve portion 222, to provide the desired frictional interference between the resilient ring 336 and the interference surface 334. FIG. 5a is a detail view of a portion of FIG. 5, which illustrates the retaining groove 332, the interference surface 334, and the resilient ring 336 positioned between the two.

The resilient ring 336 preferably has a relatively high minimum yield and can have relatively low tensile strength. The resilient ring can be formed, for example, of a neoprene or rubber-like material.

Figure 6:
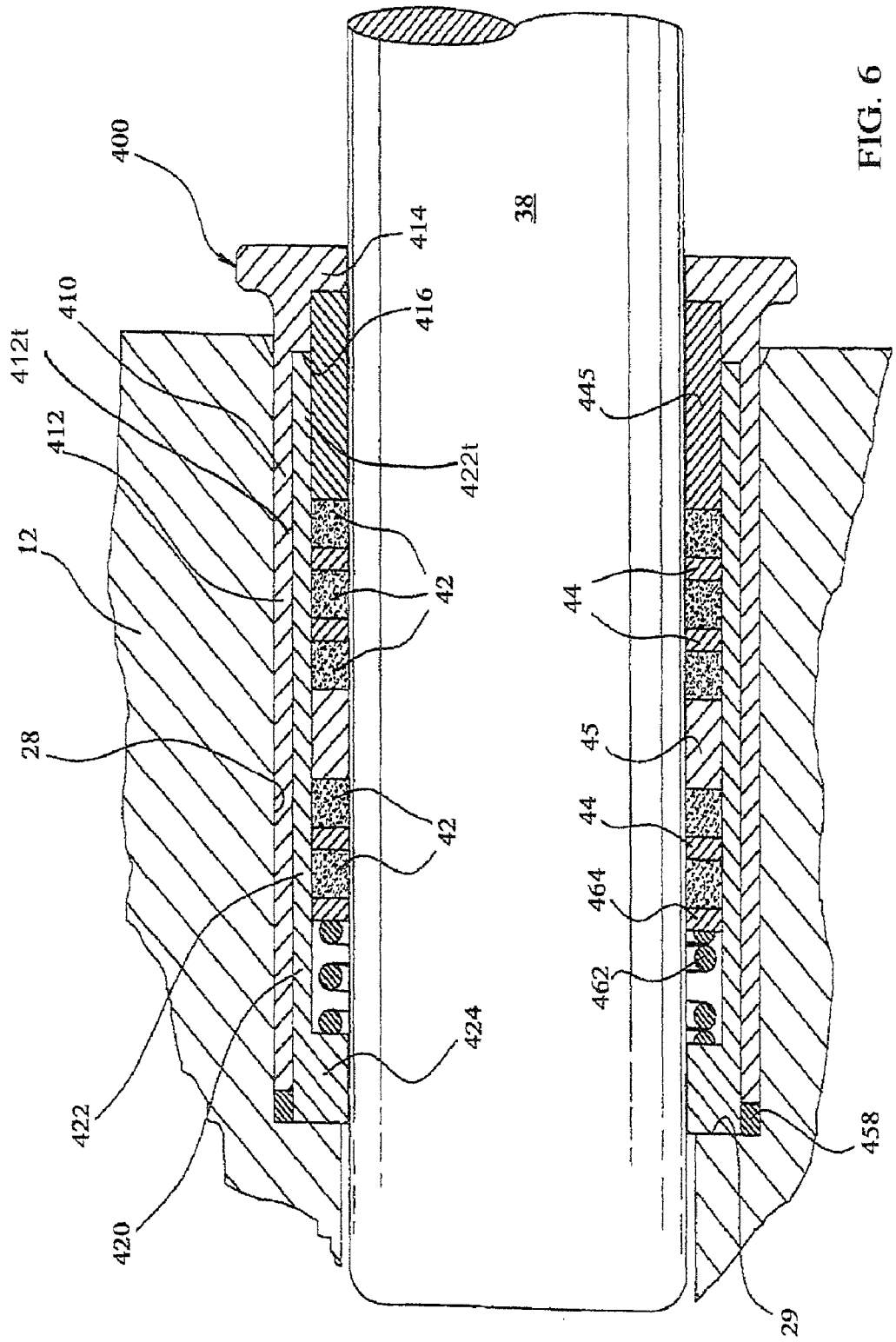
FIG. 6 is a cross-sectional view of another embodiment of a packing cartridge generally similar to the embodiment shown in FIG. 4, with a variation of the telescoping sleeve design and with the addition of a coil spring operatively positioned between the first abutment ring and the second abutment ring.

FIG. 6 is a cross-sectional view of another embodiment of a packing cartridge 400 generally similar to the embodiment shown in FIG. 4, with a variation of the telescoping sleeve design and with the addition of a coil spring 462 (sometimes referred to as a compression spring) operatively positioned between the first abutment ring and the second abutment ring.

The packing cartridge 400 includes a first element 410 comprising a first sleeve portion 412 adapted to be positioned in at least a portion of the packing bore 28, and a first abutment ring 414 positioned to extend inwardly and substantially circumferentially relative to the first sleeve portion 412. The packing cartridge 400 further includes, without limitation, a second element 420 comprising a second sleeve portion 422 having at least a portion thereof telescopically positioned in at least a portion of the first sleeve portion 412, and a second abutment ring 424 positioned to extend inwardly and substantially circumferentially relative to the second sleeve portion 422. It is to be understood, of course, that if desired the first sleeve portion 412 can alternatively be designed to telescope in the second sleeve portion 422. As shown in FIG. 6, the first abutment ring 414 is preferably integrally formed with the first sleeve portion 412 and the second abutment ring 424 is integrally formed with the second sleeve portion 422.

Preferably, a spacer ring 445 is positioned operatively to cover the overlapping travel of the telescoping structures 422t and 412t between the first and second sleeve portions 410 and 420. This spacer ring 445 helps prevent seepage of fluid into any clearances between the first sleeve portion 410 and the second sleeve portion 420. The spacer ring 445 can also act as a back-up ring for the packing rings 42.

If desired, a sealing ring 458 can be positioned between the packing cartridge 400 and the packing bore 28. Such a sealing ring 458 preferably has elastic properties with a relatively high minimum yield and can have relatively low tensile strength. The sealing ring 458 can be formed, for example, of a neoprene or rubber-like material. When positioned as shown in the embodiment of FIG. 6, the sealing ring 458 can have either a round or a rectangular cross section, whichever is preferred, although it will have some tendency to be knocked off the end of the packing cartridge 400. Thus, it is generally preferably to position a sealing ring in a sealing ring retaining groove (not shown). It is generally advantageous to position at least one sealing ring adjacent the seat 29 of the packing bore 28.

As will be appreciated, the telescoping structures 422t and 412t of the first sleeve portion 412 and the second sleeve portion 422 allow for squeezing of the first abutment ring 414 and the second abutment ring 424 co-axially closer to one another after positioning the pre-assembled packing cartridge 400 on a plunger 38 in the packing bore 28. However, in this embodiment, the packing cartridge 400 is positioned in the packing bore 28 and tightened by a gland nut (not shown) until the second sleeve portion 422 bottoms out against a shoulder 416 of the first sleeve portion 412. In this position, the coil spring 462 is compressed with a packing assembly positioned between the first abutment ring 414 and a second abutment ring 424. The advantage of bottoming out the telescoping structures 422t and 412t is that it prevents over-tightening of the packing cartridge 400 in the packing bore 28. The spring 462 maintains a pre-determined amount of axial compression on the packing rings 42 of the packing stack.

Preferably, a spring-retaining ring 464 is positioned between the coil spring 462 and the packing rings 42, which provides a stable ring against which the spring 462 can operate to compress the stack of packing rings 42 and back-up rings 44. While other types of springs can be used, such as a plurality of stacked wave springs, for example, a coil spring is presently the most preferred.

According to the example of this embodiment, the length of telescoping travel is adapted to allow for the movement of the spring 462 from a substantially relaxed condition to a substantially compressed condition. In the substantially relaxed condition, the spring 462 is not compressing the packing elements, and the packing cartridge 400 can easily be positioned as a whole on a plunger and in the packing bore 28. After being positioned in the packing bore 28, the tightening of the gland nut compresses the packing cartridge 400 between the seat 29 of the packing bore and the gland nut.

FIG. 7 is a cross-sectional view of another embodiment of a packing cartridge 500 similar in all material respects to the embodiment shown in FIG. 6, with the addition of a presently most preferred embodiment of a means for retaining the telescoping structures together. The packing cartridge 500 is shown positioned over a plunger 38, but outside of any packing bore. It is to be understood, of course, that the packing cartridge 500 can be positioned in a packing bore, like the other packing cartridge examples. FIG. 7a is an enlarged detail view of a portion of FIG. 7, shown positioned relative to a packing bore 28 of a fluid end body 12, which figure best illustrates an o-ring retaining groove 532 and an o-ring interference surface 534 cooperatively positioned between the first and second sleeve portions 412 and 422; and a resilient o-ring 536 positioned in the retaining groove 532 for frictionally engaging the interference surface 534. In contrast to the structures shown in FIGS. 5 and 5a, this embodiment illustrates the retaining groove is on the inner wall of the outer sleeve portion and the interference surface is on the outer wall of the inner sleeve portion.

When the resilient ring 536 in the retaining groove 532 is moved axially against the interference surface 534, the resilient ring 536 frictionally engages the interference surface 534 and resists separation of the first and second sleeve portions 412 and 422, and consequently, the first and second elements 410 and 420. Preferably, a sufficient clearance is provided between the telescoping surfaces of the first sleeve portion 412 and the second sleeve portion 422, to provide the desired frictional interference between the resilient ring 536 and the interference surface 534.

The resilient ring 536 preferably has a relatively high minimum yield and can have relatively low tensile strength. The resilient ring can be formed, for example, of a neoprene rubber or rubber-like material.

Figure 8:
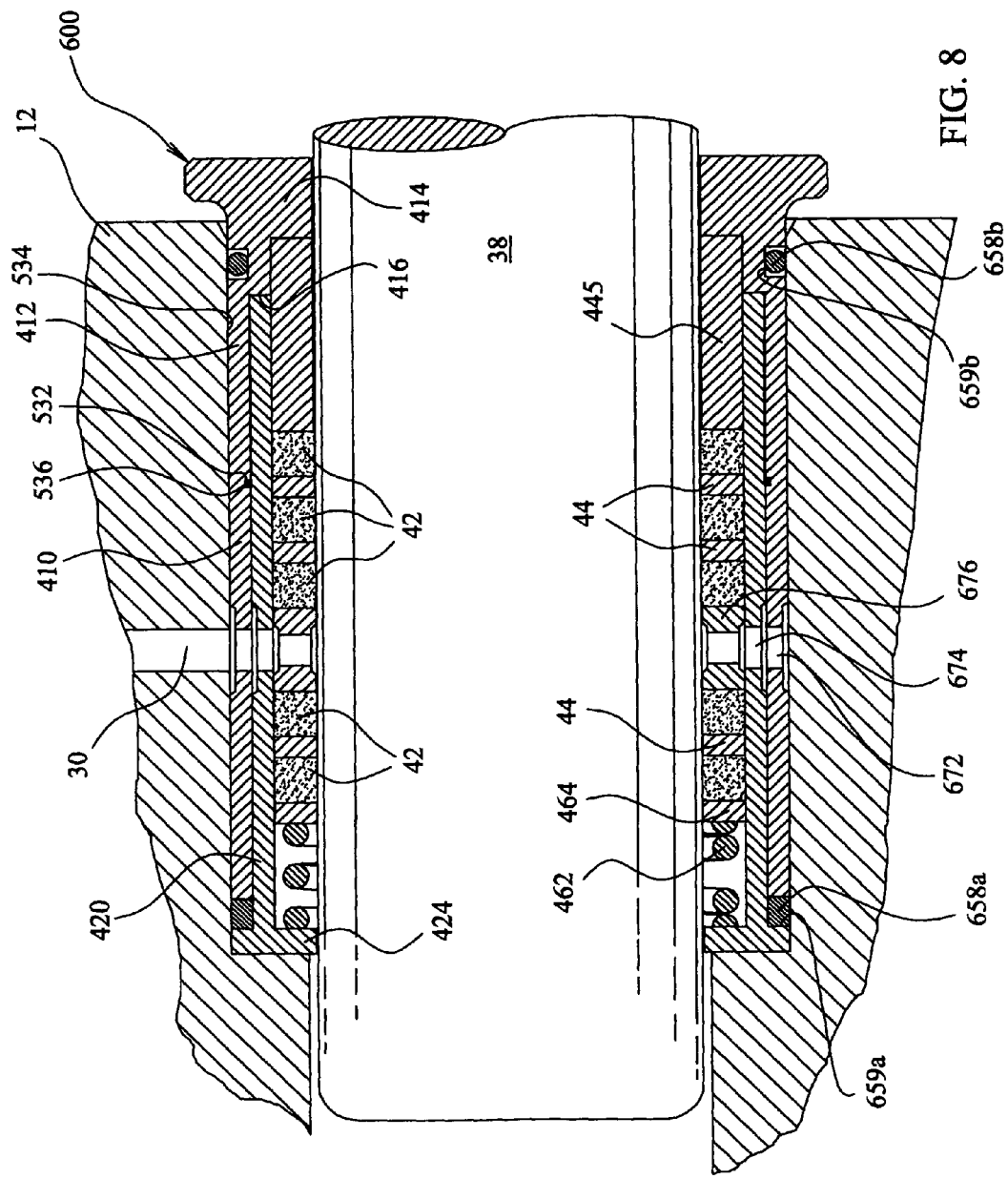
FIG. 8 is a cross-sectional view of another embodiment of a packing cartridge similar to the embodiment shown in FIG. 7, with the addition of an integrally formed lantern ring and improved external seals. The integrally formed lantern ring can be axially aligned with a lubrication port of the packing bore and an internal lantern ring can be positioned in the packing assembly to be axially aligned with the integrally formed lantern ring.

FIG. 8 is a cross-sectional view of another embodiment of a packing cartridge 600 similar in all material respects to the embodiment shown in FIG. 7, with the addition of an integrally formed lantern ring and improved external seals. The packing cartridge 600 is illustrated in the packing bore 28 of a pump. The integrally formed lantern ring can be axially aligned with a lubrication port of the packing bore and an internal lantern ring can be positioned in the packing assembly to be axially aligned with the integrally formed lantern ring In general, a lantern ring includes ring-shaped body having a circumferential outer groove and at least one internal port radially communicating from the inside wall of the groove to the interior of the ring-shaped body. Preferably, the lantern ring has a plurality of radially spaced apart internal ports. A lantern ring is adapted to be axially aligned with a lubrication port 30 of a packing bore 28. A lubricating fluid is injected through the lubrication port 30, which can move through the lubricating groove around the lantern ring and into the one or more internal ports for reaching the inside of the lantern ring. Thus, the internal ports of a lantern ring do not have to be radially aligned with the lubricating port 30.

According to the embodiment of this invention illustrated in FIG. 8, a first integrally formed lantern ring 672 is formed in the first sleeve portion 412 of the first element 410, and a second integrally formed lantern ring 674 is formed in the second sleeve portion 422 of the second element 420. The position and width of each of the first and second integrally formed lantern rings 672, 674 are adapted to be at least partially axially aligned and overlapping at least when the packing cartridge 600 is assembled and in a compressed condition. A separate internal lantern ring 676 is also cooperatively positioned in the packing stack to be at least partially axially aligned and overlapping with the integrally formed lantern ring 674 when the packing cartridge is in an assembled and compressed condition.

In addition, the embodiment of FIG. 8 illustrates variations on sealing the outside of the packing cartridge against fluid leakage. A sealing ring 658a is positioned adjacent a shoulder 659a adjacent the bottom end of the second sleeve portion 422. The shoulder 659a helps retain the sealing ring 658a on the second sleeve portion 422 positioned between the packing cartridge 600 and the packing bore 28. Such a sealing ring 658a preferably has elastic properties with a relatively high minimum yield and can have relatively low tensile strength. The sealing ring 658a can be formed, for example, of neoprene or rubber-like material. When positioned as shown in the embodiment of FIG. 8, the sealing ring 658a can have either a round or a rectangular cross section, whichever is preferred. In this embodiment, the sealing ring 658a has a rectangular cross section. It is generally more advantageous to position at least one sealing ring adjacent the seat 29 of the packing bore 28.

Further, in this embodiment of the packing cartridge 600, an additional o-ring seal 658b is positioned in a groove 659b in the outside wall of the first sleeve portion 422 above the first integrally formed lantern ring 672 of the first element 410. In an embodiment of the invention having internal lubrication, it is helpful to having at least one sealing ring both above and below the lantern ring 672 to help contain the any lubricating or other fluid from leaking around the packing cartridge 600.

Figure 9:
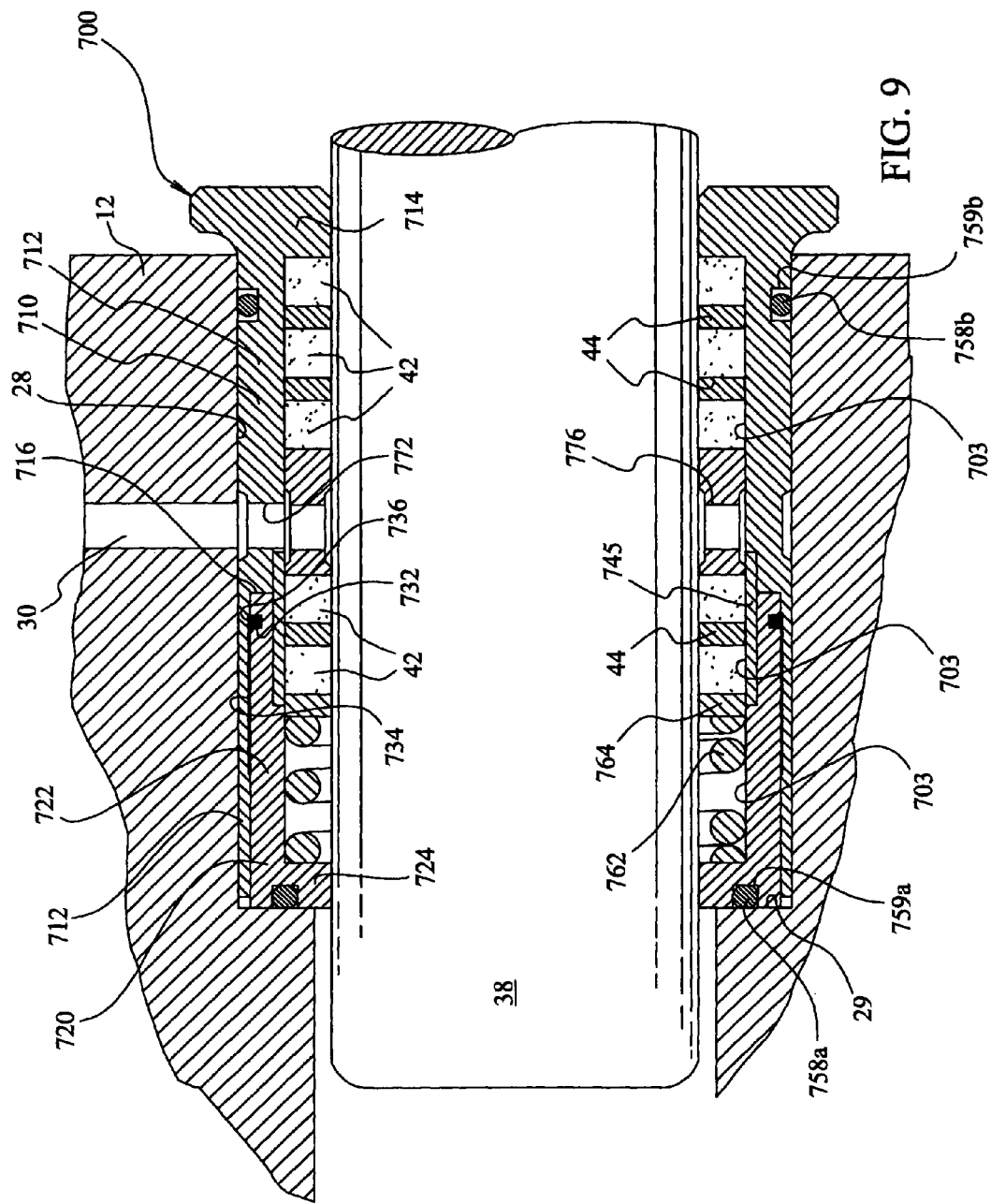
FIG. 9 is a cross-sectional view of another embodiment of a packing cartridge generally similar to the embodiment shown in FIG. 8, with a variation on the design of the telescoping structures of the first and second sleeve portions and a variation on the design of the spacer ring and the integrally formed lantern ring.

FIG. 9 is a cross-sectional view of another embodiment of a packing cartridge 700 generally similar to the embodiment shown in FIG. 8, with a variation on the design of the telescoping structures of the first and second sleeve portions and a variation on the design of the spacer ring and the integrally formed lantern ring. The packing cartridge 700 is illustrated in the packing bore 28 of a pump.

The packing cartridge 700 includes a first element 710 comprising a first sleeve portion 712 adapted to be positioned in at least a portion of the packing bore 28, and a first abutment ring 714 positioned to extend inwardly and substantially circumferentially relative to the first sleeve portion 712. The packing cartridge 700 further includes, without limitation, a second element 720 comprising a second sleeve portion 722 having at least a portion thereof telescopically positioned in at least a portion of the first sleeve portion 712, and a second abutment ring 724 positioned to extend inwardly and substantially circumferentially relative to the second sleeve portion 722. As shown in FIG. 9, the first abutment ring 714 is integrally formed with the first sleeve portion 712 and the second abutment ring 724 is integrally formed with the second sleeve portion 722. It is to be understood, of course, that if desired the first sleeve portion 712 can alternatively be designed to telescope in the second sleeve portion 722.

As will be appreciated, the telescoping structures of the first sleeve portion 712 and the second sleeve portion 722 allow for squeezing of the first abutment ring 714 and the second abutment ring 724 co-axially closer to one another after positioning the pre-assembled packing cartridge 700 on a plunger 38 in the packing bore 28. This axial squeezing is initially provided by the gland nut 32 (not shown in FIG. 9).

An o-ring retaining groove 732 and an o-ring interference surface 734 are cooperatively positioned between the first and second sleeve portions. A resilient o-ring 736 is positioned in the retaining groove 732 for frictionally engaging the interference surface 734. In this embodiment, the retaining groove is on the outer wall of the inner sleeve portion and the interference surface is on the inner wall of the outer sleeve portion.

When the resilient ring 736 in the retaining groove 732 is moved axially against the interference surface 734, the resilient ring 736 frictionally engages the interference surface 734 and resists separation of the first and second sleeve portions 712 and 722, and consequently, the first and second elements 710 and 720. Preferably, a sufficient clearance is provided between the telescoping surfaces of the first sleeve portion 712 and the second sleeve portion 722, to provide the desired frictional interference between the resilient ring 736 and the interference surface 734. This retaining assembly is similar to that illustrated in FIG. 5a, which illustrates the retaining groove 332, the interference surface 334, and the resilient ring 336 positioned between the two.

The resilient ring 736 preferably has a relatively high minimum yield and can have relatively low tensile strength. The resilient ring can be formed, for example, of neoprene or rubber-like material.

Preferably, a spacer ring 745 is operatively positioned to cover the overlapping travel of inwardly exposed area of the telescoping structures between the first and second sleeve portions 710 and 720. In this embodiment, the spacer ring 745 forms a part of the sleeve structure of the packing cartridge. This telescoping axial alignment of the first sleeve portion 712, the second sleeve portion 722, and the spacer ring 745 can be used to present a continuously smooth interior wall surface 703 between the first abutment ring 714 on the first sleeve portion 710 and the second abutment ring 724 on the second sleeve portion 720. In this embodiment, of course, the spacer ring 745 does not act as a back-up ring or otherwise as part of the packing stack of the packing rings 42.

As will be appreciated, the telescoping structures of the first sleeve portion 712 and the second sleeve portion 722 allow for squeezing of the first abutment ring 714 and the second abutment ring 724 co-axially closer to one another after positioning the pre-assembled packing cartridge 700 on a plunger 38 in the packing bore 28. However, in this embodiment, the packing cartridge 700 is positioned in the packing bore 28 and tightened by a gland nut (not shown) until the second sleeve portion 722 bottoms out against a shoulder 716 of the first sleeve portion 712. In this position, a coil spring 762 is compressed with a packing stack positioned between the first abutment ring 714 and a second abutment ring 724. The advantage of bottoming out the telescoping structures is that it prevents over-tightening of the packing cartridge 700 in the packing bore 28. The spring 762 maintains a pre-determined amount of axial compression on the packing rings 42 of the packing stack.

Preferably, a spring-retaining ring 764 is positioned between the coil spring 762 and the packing rings 42, which provides a stable ring against which the spring 762 can operate to compress the stack of packing rings 42 and back-up rings 44. While other types of springs can be used, such as a plurality of stacked wave springs, for example, a coil spring is presently the most preferred.

According to the example of this embodiment, the length of telescoping travel is adapted to allow for the movement of the spring 762 from a substantially relaxed condition to a substantially compressed condition. In the substantially relaxed condition, the spring 762 is not compressing the packing elements, and the packing cartridge 700 can easily be positioned as a whole on a plunger and in the packing bore 28. After being positioned in the packing bore 28, the tightening of the gland nut compresses the packing cartridge 700 between the seat 29 of the packing bore and the gland nut.

According to the embodiment of this invention illustrated in FIG. 9, an integrally formed lantern ring 772 is formed in the first sleeve portion 412 of the first element 410. A separate internal lantern ring 776 is also cooperatively positioned in the packing stack to be at least partially axially aligned and overlapping with the integrally formed lantern ring 772 when the packing cartridge is in an assembled and compressed condition.

This embodiment illustrates an alternative design for a sealing ring 758a that is positioned in a sealing ring groove 759b in the bottom shoulder of the second element 720 between the packing cartridge 700 and the seat 29 of the packing bore 28. Such a sealing ring 758a preferably has elastic properties with a relatively high minimum yield and can have relatively low tensile strength. The sealing ring 758a can be formed, for example, of neoprene or rubber-like material.

Further, in this embodiment of the packing cartridge 700, an additional o-ring seal 758b is positioned in a groove 759b in the outside wall of the first sleeve portion 712 above the integrally formed lantern ring 772 of the first element 710. In an embodiment of the invention having internal lubrication, it is helpful to having at least one sealing ring both above and below the lantern ring 772 to help contain the any lubricating or other fluid from leaking around the packing cartridge 700.

The packing cartridge 700 is adapted to be completely pre-assembled prior to positioning on a plunger and installed in the packing bore 28. The telescoping structures allow for squeezing of the first abutment ring 714 and the second abutment ring 724 co-axially closer to one another after positioning the packing cartridge 700 in the packing bore 28. Of course, while the packing cartridge 700 allows for pre-assembly of the packing cartridge prior to use in the field, it can be assembled in the field, if desired.

For example, the packing cartridge 700 can be advantageously used according to an aspect of the invention by completely pre-assembling the cartridge prior to taking it to the field for installation in a pump. In the field, a plunger can be inserted through the pre-assembled packing cartridge 700. The plunger and packing cartridge 700 thereon can then be positioned in the packing bore 28. A gland nut (not shown) can next be tightened over the packing cartridge 700 to axially compress the packing cartridge 700 between the seat 29 of the packing bore 28 and the gland nut. This squeezes the first element 710 toward the second element 720 and compresses the packing stack 42, 44 on the plunger 38.

Figure 10:
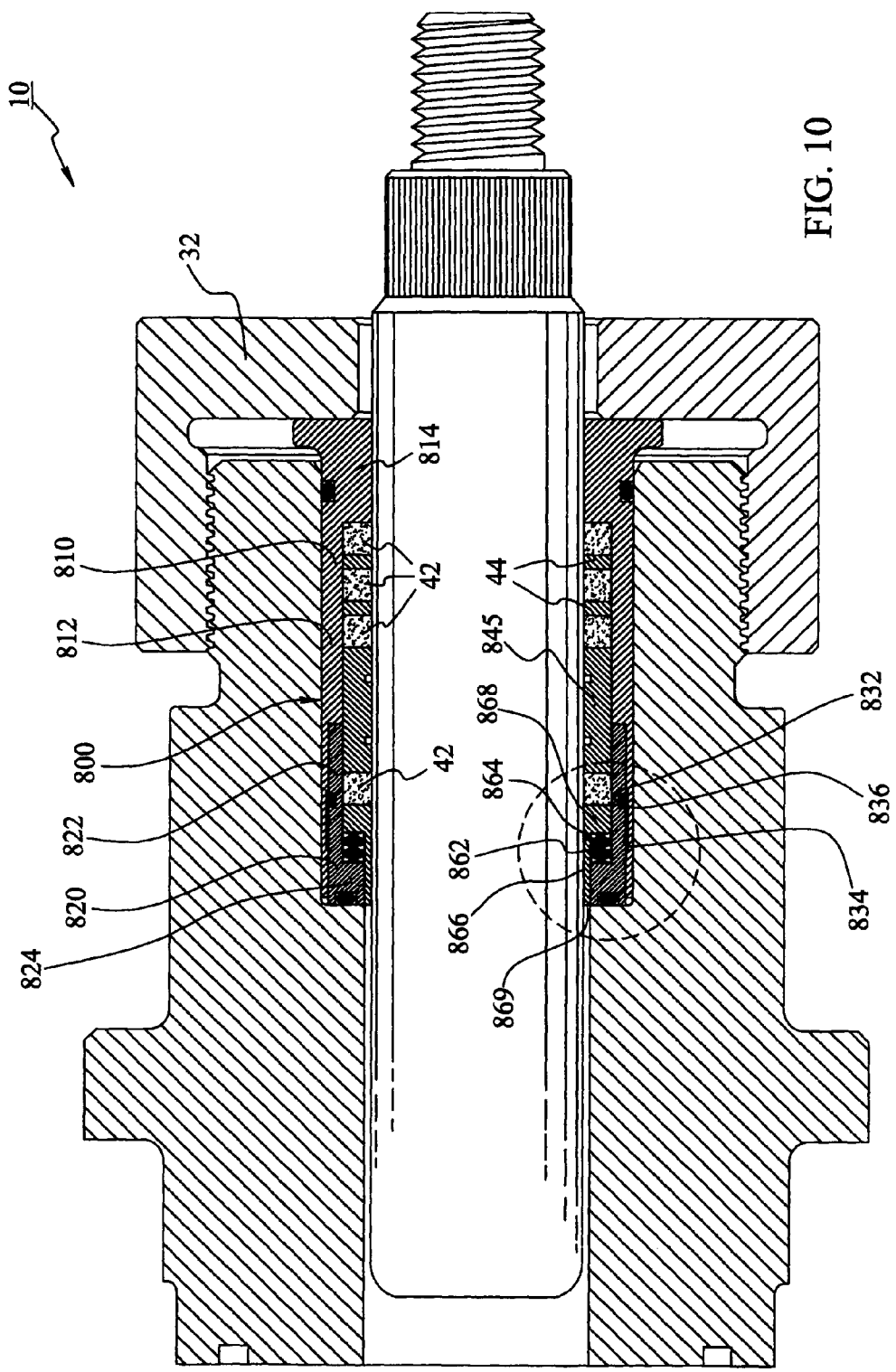
FIG. 10 is a cross-sectional view of another embodiment of a packing cartridge generally similar to the embodiment shown in FIG. 9, with variations including a snap ring to retain the sleeve portions together and a spring sleeve portion isolates and protects the coil spring from the reciprocating plunger.

FIG. 10 is a cross-sectional view of another embodiment of a packing cartridge 800 generally similar to the embodiment shown in FIG. 9, with variations including a snap ring to retain the sleeve portions together and a spring sleeve portion isolates and protects the coil spring from the reciprocating plunger. The packing cartridge 800 is illustrated in the packing bore 28 of a pump, including a gland nut 32 positioned over the packing cartridge 800.

The packing cartridge 800 includes a first element 810 comprising a first sleeve portion 812 adapted to be positioned in at least a portion of the packing bore 28, and a first abutment ring 814 positioned to extend inwardly and substantially circumferentially relative to the first sleeve portion 812. The packing cartridge 800 further includes, without limitation, a second element 820 comprising a second sleeve portion 822 having at least a portion thereof telescopically positioned in at least a portion of the first sleeve portion 812, and a second abutment ring 824 positioned to extend inwardly and substantially circumferentially relative to the second sleeve portion 822. As shown in FIG. 10, the first abutment ring 814 is integrally formed with the first sleeve portion 812 and the second abutment ring 824 is integrally formed with the second sleeve portion 822. It is to be understood, of course, that if desired the first sleeve portion 812 can alternatively be designed to telescope in the second sleeve portion 822.

As will be appreciated, the telescoping structures of the first sleeve portion 812 and the second sleeve portion 822 allow for squeezing of the first abutment ring 814 and the second abutment ring 824 co-axially closer to one another after positioning the pre-assembled packing cartridge 800 on a plunger 38 in the packing bore 28. This axial squeezing is initially provided by the gland nut 32.

A snap ring retaining groove 832 and a snap ring engaging groove 834 are cooperatively positioned between the first and second sleeve portions. A snap ring 836 is positioned in the retaining groove 832 for snapping into the snap ring engaging groove 834. The snap-ring engaging groove 834 is relatively wide, allowing the snap ring 836 to ride telescopically between the shoulders of the snap-ring engaging groove 834.

When the snap ring 836 in the retaining groove 832 is moved axially into alignment with a portion of the snap ring engaging groove 834, the resilient ring 832 snaps outward into the snap ring engaging groove 834. The upper and lower shoulders of the snap ring engaging groove 834 thereby limit the axial movement of the snap ring 836 to resist the separation of the first and second sleeve portions 812 and 822, and consequently, the first and second elements 810 and 820. This retaining assembly is similar to that illustrated in FIG. 3a, which illustrates the snap ring retaining groove 134, the snap ring engaging groove 136a, and the snap ring 132 positioned between the two.

Preferably, a spacer ring 845 is operatively positioned to cover the overlapping travel of inwardly exposed area of the telescoping structures between the first and second sleeve portions 810 and 820. In this example, the spacer ring 845 is part of the packing stack.

A spring sleeve 864 is provided to isolate and protect the wave spring 862 from the reciprocating plunger. The spring sleeve includes a sleeve portion 866 and a spacer portion 868. The sleeve portion 866 has a shoulder having a downwardly facing surface 869. Preferably, as little as possible of such a shoulder 869 is presented in any annular clearance between the any portion of the packing cartridge 800 and the plunger 38. The fluctuating fluid pressures acting on such an exposed shoulder surface 869 can transfer changing fluid pressures into reciprocating motion acting against the spring and the packing rings 42, causing additional wear.

FIG. 10a is an enlarged detail view of a portion of FIG. 10, which illustrates in more detail the spring sleeve portion that isolates and protects the coil spring from the reciprocating plunger.

FIG. 11 is a cross-sectional view of yet another embodiment of a packing cartridge 900 generally similar to FIG. 5, with the addition of a snap ring connection 132, 134, and 136 between the first sleeve portion 212 and the first abutment 214 and with the addition of milled slots 982 formed in the bottom 910 of the second element 220 to facilitate prying the cartridge 900 out of the packing bore 28 in case it becomes wedged.

Packing Cartridges Embodiments Having Pressure-Cycle Dampening Ring

Figure 12:
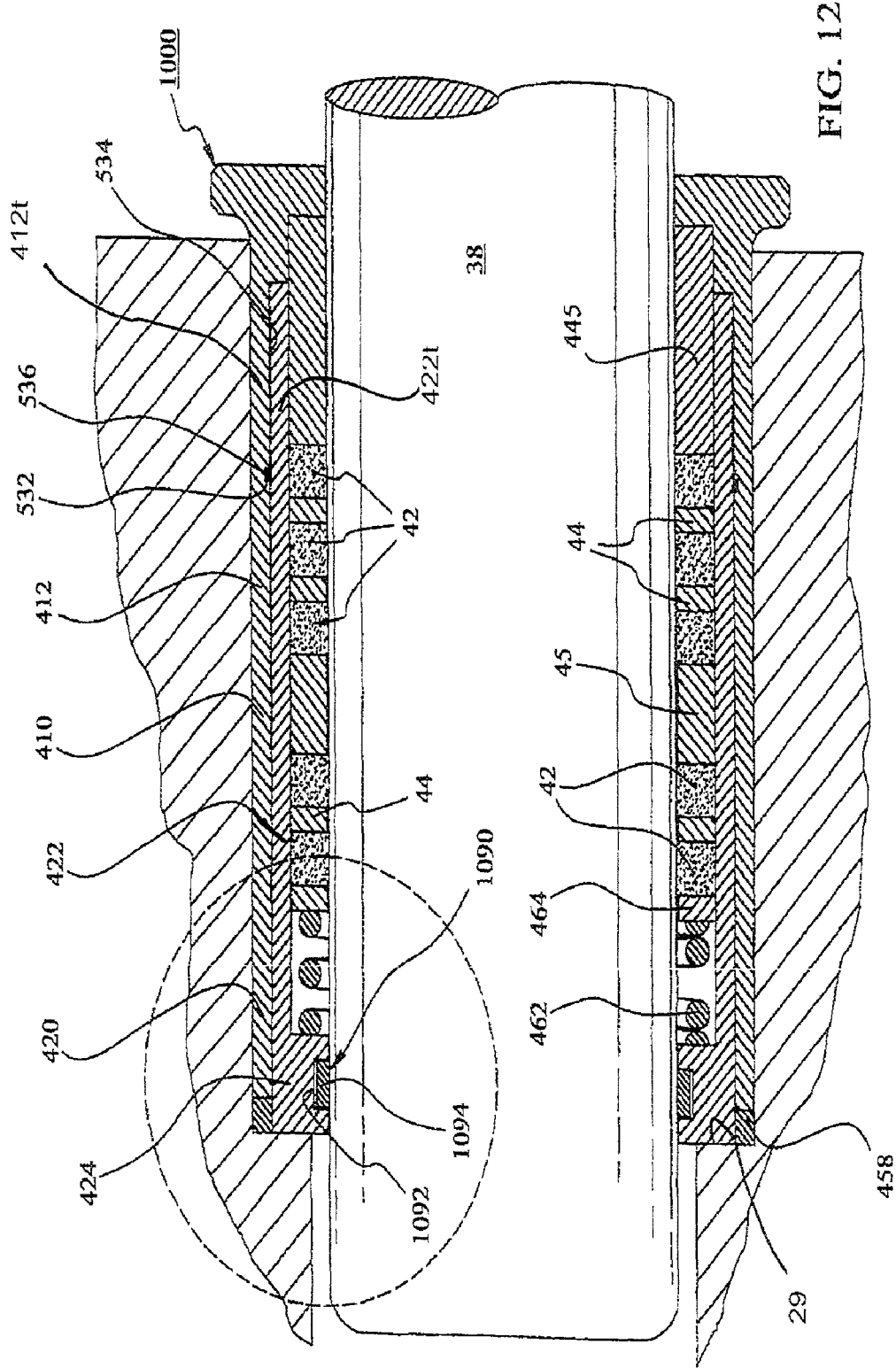
FIG. 12 is a cross-sectional view of another embodiment of a packing cartridge similar to the embodiment shown in FIG. 7, with the addition of a structure forming a circumferential pressure-ring groove, in this case the structure being a portion of the first abutment ring, and a pressure ring positioned in the pressure-ring groove. The pressure ring preferably has a slightly smaller internal diameter than the outside diameter of the plunger, which provides a tight interference fit on the plunger. The pressure ring has a relatively thin wall thickness to allow for expansion of the ring over the diameter of the plunger. The pressure ring also has at least one smaller external dimension than an internal dimension of the pressure-ring groove, whereby at least one clearance is provided between the pressure-ring groove and the pressure ring.
Figure 12A:
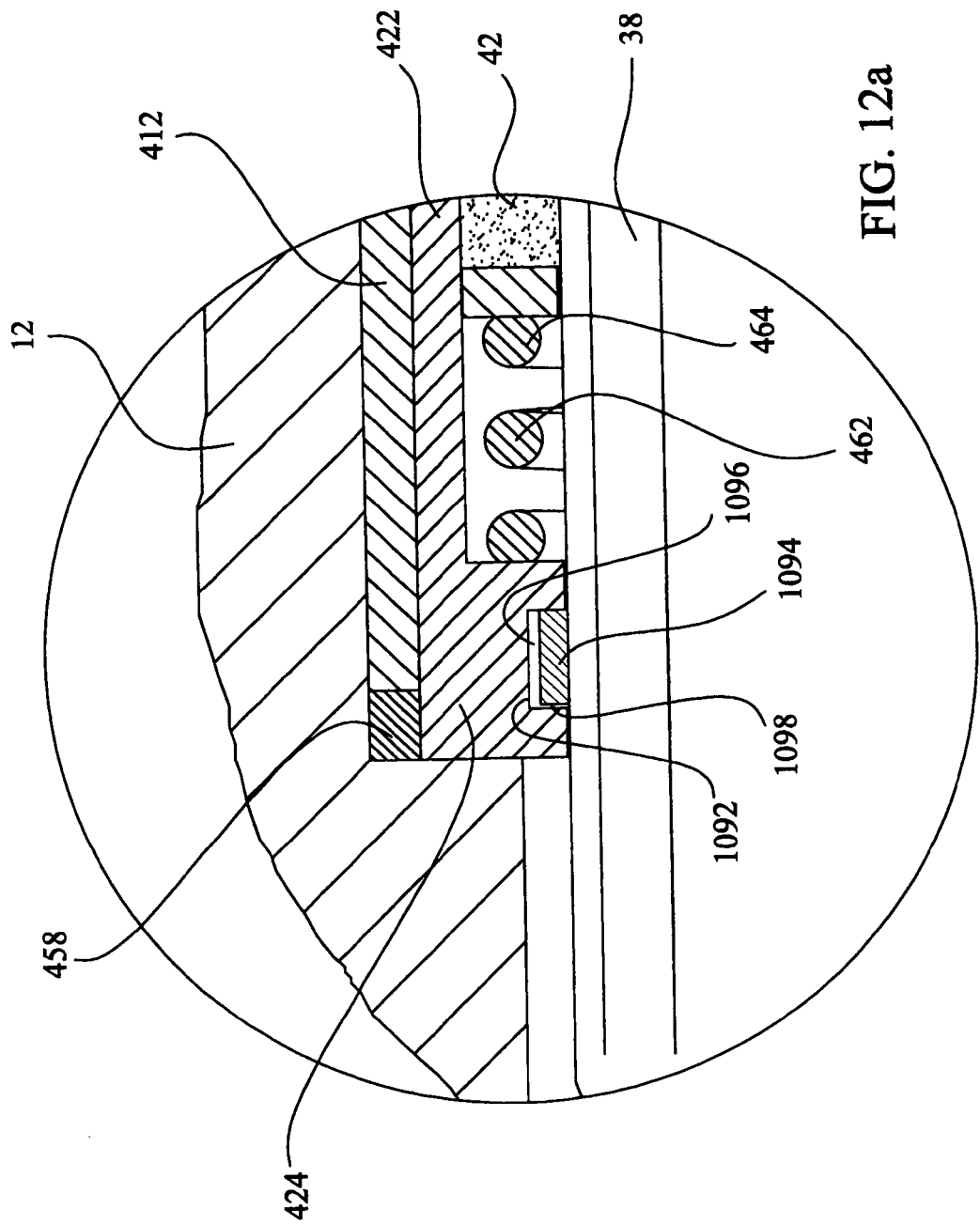
FIG. 12a is a detail view of a portion of FIG. 12, which illustrates the pressure-ring groove and the pressure ring.

FIG. 12 is a cross-sectional view of another embodiment of a packing cartridge 1000 similar in all material respects to the embodiment shown in FIG. 7, with the addition of a means 1090 for dampening the impact of pressure cycles on the packing. According to this aspect of the invention, a circumferential pressure-ring groove 1092 is formed in a structure of the packing cartridge 1000, in this case the structure being a portion of the second abutment ring 424, and a pressure ring 1094 is positioned in the pressure-ring groove 1092. FIG. 12a is a detail view of a pressure-ring groove 1092 and pressure ring 1094. (As will hereinafter be discussed in detail, in another embodiment of the invention, the pressure-ring groove can be formed in an independent housing ring that can be independently stacked in the packing bore with the packing rings.)

According to this further aspect of the invention, the pressure ring 1094 preferably has a slightly smaller internal diameter than the outside diameter of the plunger, which provides a tight interference fit of the pressure ring 1094 on the plunger.

Preferably, the pressure ring 1094 has a relatively thin wall thickness to better allow for expansion of the ring over the diameter of the plunger. The pressure ring 1094 has at least one smaller external dimension than an internal dimension of the pressure-ring groove 1092, whereby at least one clearance is provided between the pressure-ring groove and the pressure ring 1094.

Preferably, the pressure ring 1094 has an inwardly facing surface with a low coefficient of friction, that is, it has a relatively slippery or slick surface characteristic. In addition, the pressure ring 1094 has some elastic characteristics. Most preferably, the pressure ring 1094 has relatively high tensile strength and relatively low minimum yield.

Preferably, the pressure ring 1094 is made of a plastic material having these physical characteristics, such as an organic polymer. Most preferably, the plastic of the pressure ring 1094 is a fluorocarbon polymer, such as polytetrafluoroethylene ("PTFE"), which is commercially available under the brand name (Teflon®). The plastic can also be, for example, an oil-impregnated plastic.

The pressure-ring groove 1092 preferably has a slightly larger inside diameter than the outside diameter of the pressure ring, which provides a circumferential clearance 1096 between the inside diameter of the pressure-ring groove and the outside diameter of the pressure ring 1094. As the reciprocating plunger wears down the thickness of the pressure ring, the circumferential clearance increases between the inside diameter of the pressure-ring groove and the outside diameter of the pressure ring 1094. The circumferential clearance is at least sufficient to allow for the expansion of the pressure ring 1094 into the groove when it is stretched over the outside diameter of the plunger. Typically, this would be at least 0.01 inch clearance. Of course, engineering tolerances are not always that precise, so the clearance can be designed to be larger for that reason. Furthermore, a larger circumferential clearance would be expected to work, provided that there is an adequate face-to-face overlap between the shoulders of the pressure ring and the shoulders of the pressure-ring groove 1092 to secure the pressure ring 1094 in the groove.

The pressure-ring groove 1092 preferably also has a slightly larger axial height than the axial height of the pressure ring 1094. This creates an axial clearance 1098 between the height of the pressure ring and the height of the pressure-ring groove. The axial clearance is needed to get the pressure ring 1094 into the pressure-ring groove 1092. The ring 1094 is collapsed by folding during assembly. When the ring is unfolded into the groove, the ring cannot come out. This axial height clearance also allows high-pressure fluid to enter any circumferential clearance between the inside diameter of the pressure-ring groove and the outside diameter of the pressure ring 1094.

On the downward stroke of the plunger (which is sometimes considered to be the "forward stroke" toward the bottom end of the packing bore), the increasing pressure forces fluid in the annular clearance between the inwardly facing diameter of the plunger bore and the plunger. The developing fluid pressure hits the lower, downwardly facing shoulder of the pressure ring. This tends to push the pressure ring upward against the upper, downwardly facing shoulder of the pressure-ring groove. While this may not form a perfect seal, it is believed this contact at least helps reduce fluid and developing fluid pressure from passing the pressure-ring. Most preferably, according to this aspect of the invention, the pressure ring 1094 is positioned to protect the area of at least the next adjacent pieces packing.

It is believed that any clearances between the pressure ring 1094 and the pressure-ring groove 1092 act as a fluid capacitor, which can help delay the development of the high pressure on the outside diameter of the pressuring ring until the plunger reaches its upward stroke (sometimes referred to as the "back stroke"). This effect is believed to reduce or soften the impact of rapid pressure changes on any packing elements above.

As the plunger continues to reciprocate, it wears the thickness of the pressure ring. This wear occurs at the inwardly facing surface of the pressure ring 1094. The wear effectively increases the internal diameter of the pressure ring 1094. The elastic property of the pressure ring 1094 causes it to contract back toward is original state, helping to maintain a surface-to-surface sliding engagement against the plunger. As long as this sliding interference fit is present, it seals or reduces the escape of high-pressure fluid between the pressure ring 1094 and the plunger 38, which reduces the impact of fluid pressure changes acting on any packing above.

It is believed that a primary benefit of the pressure ring 1094 in the pressure-ring groove 1092 is to reduce or slightly delay the harsh pressure impact, which would otherwise directly impact the first few pieces of packing material 42.

Figure 13:
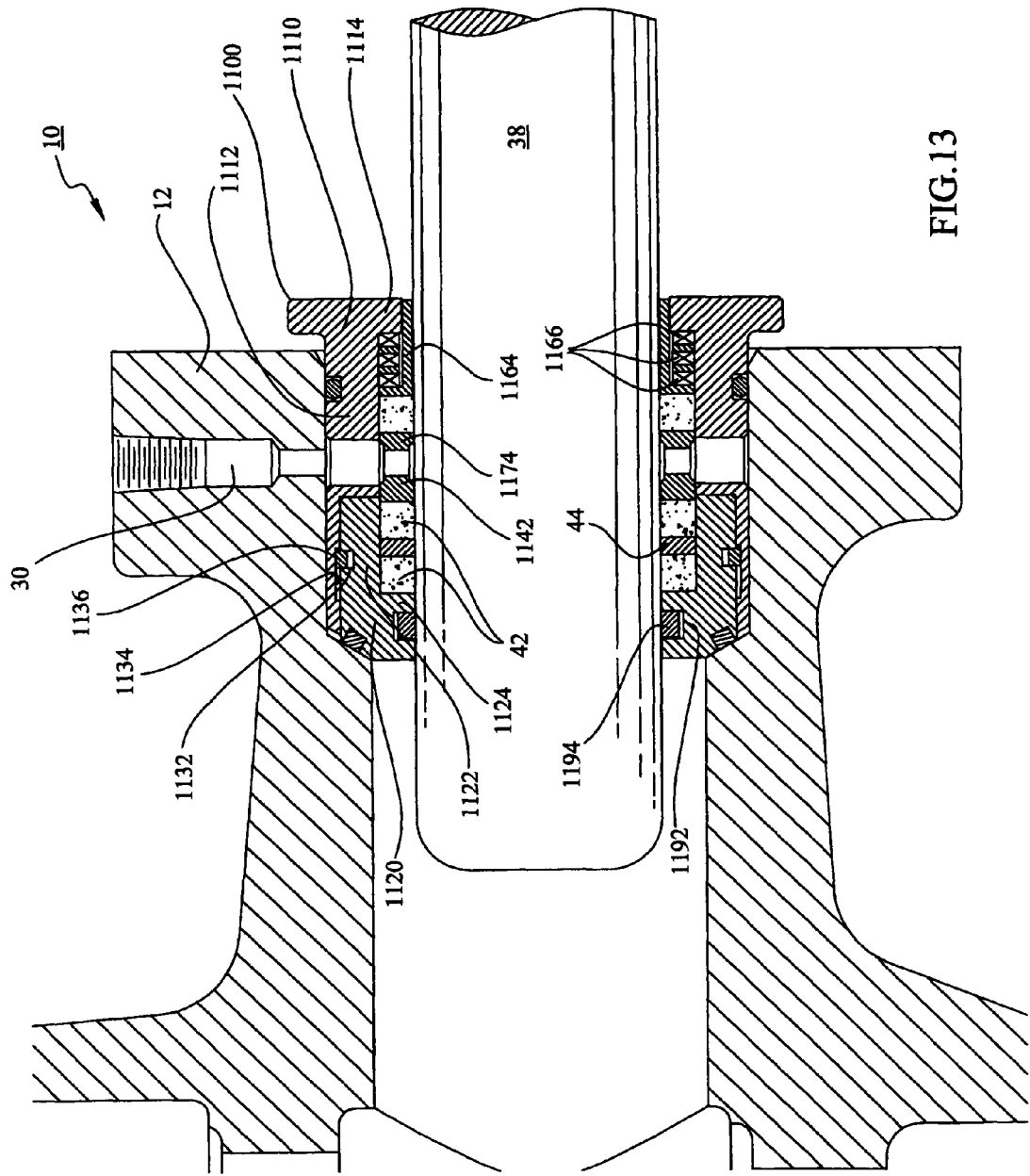
FIG. 13 is a cross-sectional view of yet another embodiment of a packing cartridge according to various aspects of the invention. The packing cartridge is shown positioned in the packing bore of a pump. The packing cartridge includes, for example, a retaining groove and a receiving groove cooperatively positioned in the telescoping structures of the first and second sleeve portions, and a snap ring positioned in the retaining groove. The retaining ring is adapted for snapping into the receiving groove. When the snap ring in the retaining groove is moved axially into alignment with the receiving groove, the snap ring snaps into the receiving groove. The shoulders of the snap ring are then positioned to interfere with the corresponding shoulders of the retaining groove and receiving groove, which resists separation of the first and second sleeve portions. This embodiment also has a third sleeve portion that isolates and protects a plurality of wave springs from the reciprocating plunger. In this embodiment, the spacer ring is an integrally formed portion of a lantern ring for internal lubrication of the packing bore. In addition, the packing cartridge illustrates an embodiment in which a spring can be positioned toward the top of the packing cartridge.

FIG. 13 is a cross-sectional view of yet another embodiment of a packing cartridge 1100 according to various aspects of the invention. The packing cartridge 1100 is illustrated in the packing bore 28 of a pump.

The packing cartridge 1100 includes a first element 1110 comprising a first sleeve portion 1112 adapted to be positioned in at least a portion of the packing bore 28, and a first abutment ring 1114 positioned to extend inwardly and substantially circumferentially relative to the first sleeve portion 1112. The packing cartridge 1100 further includes, without limitation, a second element 1120 comprising a second sleeve portion 1122 having at least a portion thereof telescopically positioned in at least a portion of the first sleeve portion 1112, and a second abutment ring 1124 positioned to extend inwardly and substantially circumferentially relative to the second sleeve portion 1122. It is to be understood, of course, that if desired the first sleeve portion 1112 can alternatively be designed to telescope in the second sleeve portion 1122. As shown in FIG. 13, the first abutment ring 1114 is integrally formed with the first sleeve portion 1112 and the second abutment ring 1124 is integrally formed with the second sleeve portion 1122.

As will be appreciated, the telescoping structures of the first sleeve portion 1112 and the second sleeve portion 1122 allow for squeezing of the first abutment ring 1114 and the second abutment ring 1124 co-axially closer to one another after positioning the pre-assembled packing cartridge 1100 on a plunger 38 in the packing bore 28. This axial squeezing is initially provided by the gland nut (not shown).

The packing cartridge 1100 includes, for example, a retaining groove 1132 and a receiving groove 1134 cooperatively positioned in the telescoping structures of the first and second sleeve portions, and a snap ring 1136 positioned in the retaining groove 1132. The retaining snap ring 1136 is adapted for snapping into the receiving groove 1134. When the snap ring 1136 in the retaining groove 1132 is moved axially into alignment with the receiving groove 1134, the snap ring 1136 snaps into the receiving groove 1134. The shoulders of the snap ring 1136 are then positioned to interfere with the corresponding shoulders of the retaining groove 1132 and receiving groove 1134, which resists separation of the first and second sleeve portions.

In an alternative to the design of packing cartridge 1100, instead of a snap ring 1136, an o-ring (not shown) can be used in the retaining groove 1132, which would resist but allow separation of the telescoping members without damage to any of the o-ring or any of the other pieces.

This embodiment also has a spring sleeve 1164 portion that isolates and protects a plurality of wave springs 1166 from the reciprocating plunger 38. In addition, the packing cartridge 1100 illustrates an embodiment in which the spring mechanism can be positioned toward the top of the packing cartridge. In this embodiment, the spring sleeve 1164 is advantageously designed to not present any exposed shoulder to changing fluid pressures.

In this embodiment, the spacer ring 1142 is an integrally formed portion of a lantern ring 1174 for internal lubrication of the packing bore.

A circumferential pressure-ring groove 1192 is formed in a structure of the packing cartridge 1100, in this case the structure being a portion of the second abutment ring 1124, and a pressure ring 1194 is positioned in the pressure-ring groove 1192.

Figure 14:
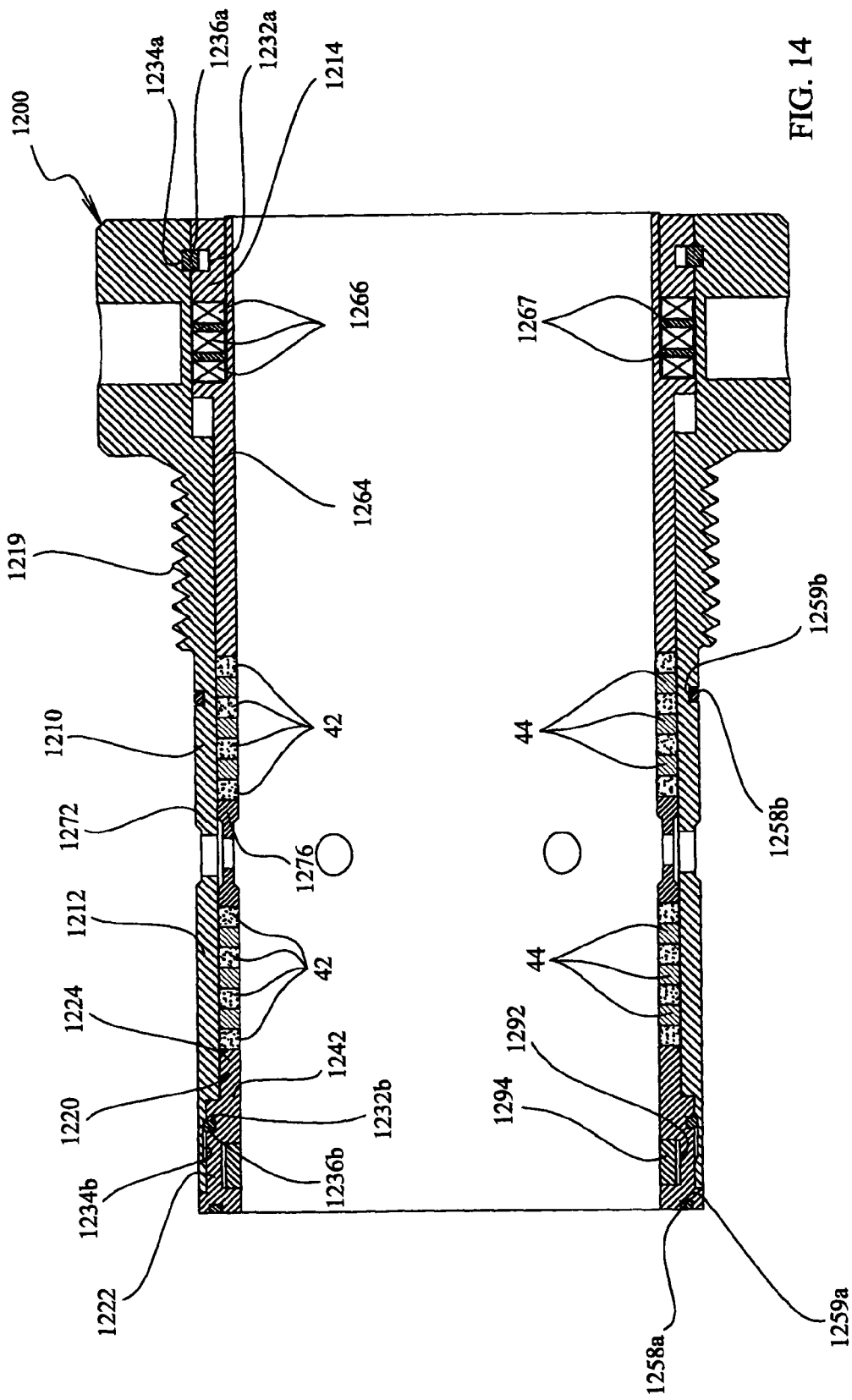
FIG. 14 is a cross-sectional view of yet another embodiment of a packing cartridge according to various aspects of the invention. This packing assembly is shown in a compressed condition as it would be when positioned in the packing bore of a pump, but for clarity of this figure the packing bore is not shown. This design also illustrates a threaded connector on the exterior of the sleeve.

FIG. 14 is a cross-sectional view of yet another embodiment of a packing cartridge 1200 according to various aspects of the invention. This embodiment is generally similar to the embodiment illustrated in FIG. 13, with design variations.

The packing cartridge 1200 illustrated in FIG. 14 includes a first element 1210 comprising a first sleeve portion 1212 adapted to be positioned in at least a portion of the packing bore, and a first abutment ring 1214 positioned to extend inwardly and substantially circumferentially relative to the first sleeve portion 1212. The packing cartridge 1200 further includes, without limitation, a second element 1220 comprising a second sleeve portion 1222 having at least a portion thereof telescopically positioned in at least a portion of the first sleeve portion 1212, and a second abutment ring 1224 positioned to extend inwardly and substantially circumferentially relative to the second sleeve portion 1222. It is to be understood, of course, that if desired the first sleeve portion 1212 can alternatively be designed to telescope in the second sleeve portion 1222.

As shown in FIG. 14, the first abutment ring 1214 is separately formed from the first sleeve portion 1212. For example, this design illustrates that a retaining groove 1232a and a receiving groove 1234a cooperatively positioned between the first abutment ring 1214 and the first sleeve portion 1212, respectively, and a snap ring 1236a positioned in the retaining groove 1232a can be used to operatively connect the first abutment ring 1214 to the first sleeve portion 1212. The second abutment ring 1224 is integrally formed with the second sleeve portion 1222.

As will be appreciated, the telescoping structures of the first sleeve portion 1212 and the second sleeve portion 1222 allow for squeezing of the first abutment ring 1214 and the second abutment ring 1224 co-axially closer to one another after positioning the pre-assembled packing cartridge 1200 on a plunger 38 in the packing bore 28. This axial squeezing is initially provided by the gland nut (not shown).

The packing cartridge 1200 also illustrates a threaded connector 1219 on the exterior of the first sleeve portion 1210.

An o-ring retaining groove 1232b and an o-ring interference surface 1234b are cooperatively positioned between the first and second sleeve portions 1212 and 1222. A resilient o-ring 1236b is positioned in the retaining groove 1232b for frictionally engaging the interference surface 1234b. In this embodiment, the retaining groove 1232b is on an outer wall of the inner sleeve portion 1222 and the interference surface 1234b is on an inner wall of the outer sleeve portion 1212.

When the resilient ring 1236b in the retaining groove 1232b is moved axially against the interference surface 1234b, the resilient ring 1236b frictionally engages the interference surface 1234b and resists separation of the first and second sleeve portions 1212 and 1222, and consequently, the first and second elements 1210 and 1220. Preferably, a sufficient clearance is provided between the telescoping surfaces of the first sleeve portion 1212 and the second sleeve portion 1222, to provide the desired frictional interference between the resilient ring 1236b and the interference surface 1234b. This retaining assembly is similar to that illustrated in FIG. 5a, which illustrates the retaining groove 332, the interference surface 334, and the resilient ring 336 positioned between the two.

The resilient ring 1236b preferably has a relatively high minimum yield and can have relatively low tensile strength. The resilient ring can be formed, for example, of neoprene or rubber-like material.

In this embodiment, the spacer ring 1242 is an integrally formed portion of the second abutment ring 1224.

This embodiment also has a spring sleeve 1264 portion that isolates and protects a plurality of wave springs 1266 from the reciprocating plunger 38. The wave springs 1266 are preferably separated by a plurality of spring spacers 1267. In addition, the packing cartridge 1200 illustrates an embodiment in which the spring mechanism can be positioned toward the top of the packing cartridge. In this embodiment, the spring sleeve 1264 is advantageously designed to not present any exposed shoulder to changing fluid pressures.

According to the embodiment of this invention illustrated in FIG. 14, an integrally formed lantern ring 1272 is formed in the first sleeve portion 1212 of the first element 1210. A separate internal lantern ring 1276 is also cooperatively positioned in the packing stack to be at least partially axially aligned and overlapping with the integrally formed lantern ring 1272 when the packing cartridge 1200 is in an assembled and compressed condition.

This embodiment illustrates a sealing ring 1258a that is positioned in a sealing ring groove 1259a in the bottom shoulder of the second element 1220. Such a sealing ring 1258a preferably has elastic properties with a relatively high minimum yield and can have relatively low tensile strength. The sealing ring 1258a can be formed, for example, of neoprene or rubber-like material.

Further, in this embodiment of the packing cartridge 1200, an additional o-ring seal 1258b is positioned in a groove 1259b in the outside wall of the first sleeve portion 1212 above the integrally formed lantern ring 1272 of the first element 1210. In an embodiment of the invention having internal lubrication, it is helpful to having at least one sealing ring both above and below the lantern ring 1272 to help contain the any lubricating or other fluid from leaking around the packing cartridge 1200.

A circumferential pressure-ring groove 1292 is formed in a structure of the packing cartridge 1200, in this case the structure being a portion of the second abutment ring 1224, and a pressure ring 1294 is positioned in the pressure-ring groove 1292.

Figure 14A:
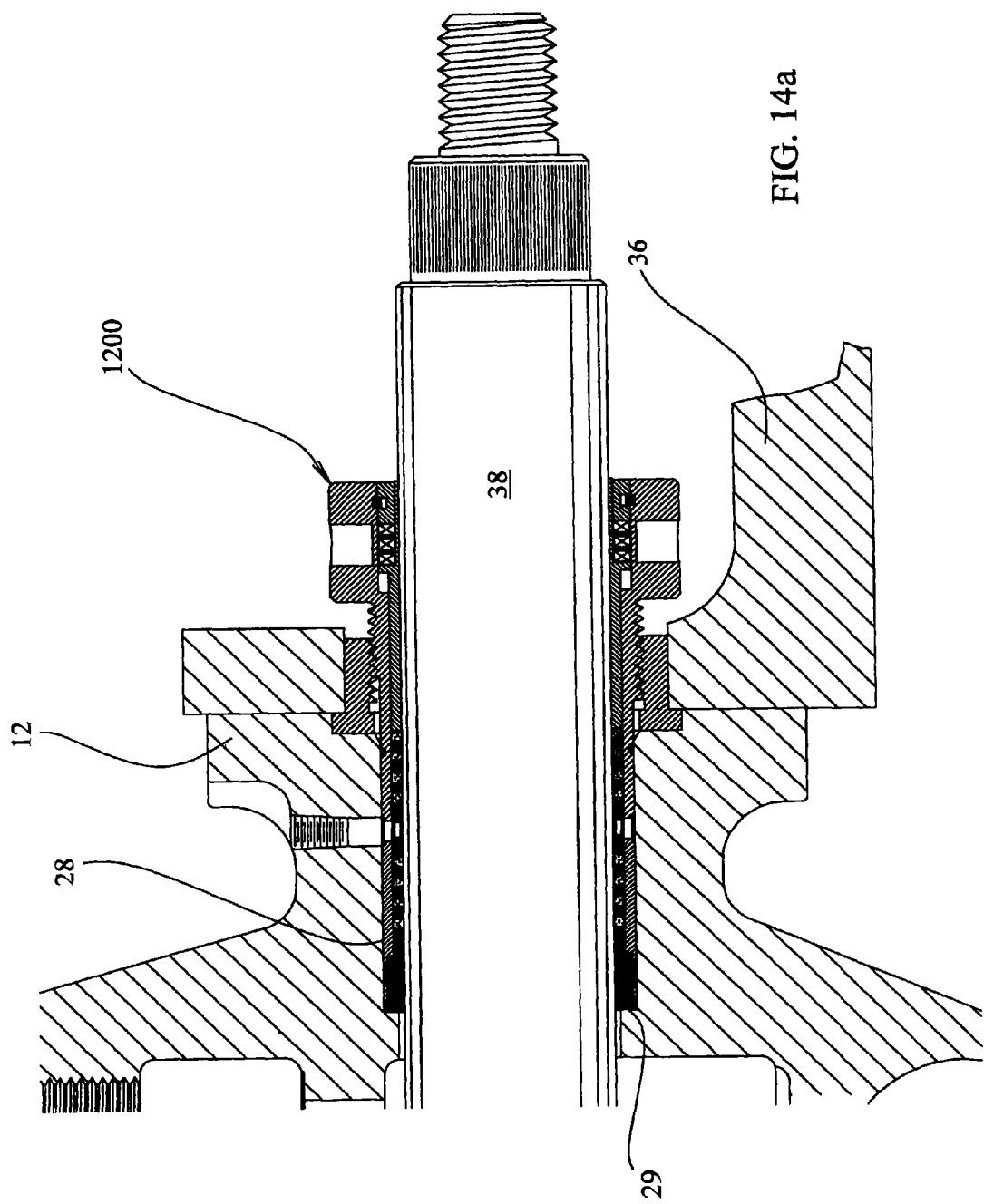
FIG. 14a is a cross-sectional view of the packing cartridge shown in FIG. 14, shown with the surrounding packing bore and portion of a pump.

FIG. 14a is a cross-sectional view of the packing cartridge 1200 shown in FIG. 14, shown with the surrounding packing bore 28 and the context of the fluid end body 12 and power frame 36 of a pump.

Figure 15:
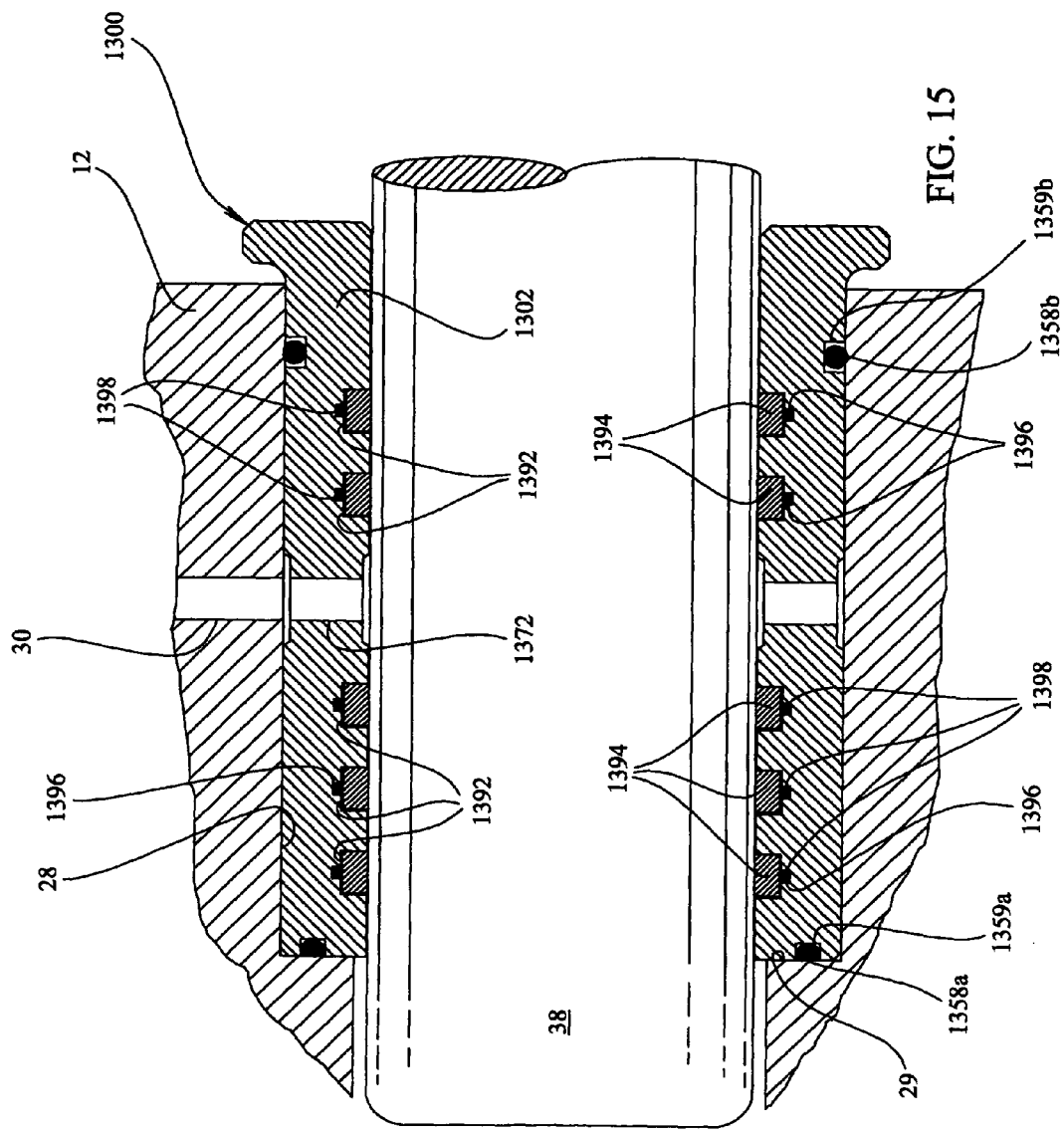
FIG. 15 is a cross-sectional view of yet another embodiment of a packing cartridge according to yet another aspect of the invention. The packing cartridge is shown positioned in the packing bore of a pump. According to this aspect of the invention, the packing cartridge comprises: a sleeve adapted to be at least partially inserted into the packing bore; a plurality of structures each forming a circumferential pressure-ring groove; and a pressure ring positioned in each of the pressure-ring grooves. The pressure ring has at least one smaller external dimension than an internal dimension of the pressure-ring groove. This provides at least one clearance between the pressure-ring groove and the pressure ring. In addition, according to this preferred embodiment of such a packing cartridge, a sealing ring is positioned adjacent the clearance between the pressure-ring groove and the pressure ring to reduce seepage around the clearance.

FIG. 15 is a cross-sectional view of yet another embodiment of a packing cartridge 1300 according to yet another aspect of the invention. The packing cartridge 1300 is shown installed in a packing bore 28 having a seat 29 and internal lubrication port 30 as formed by the fluid end body 12 of a pump.

According to this embodiment of the invention, the packing cartridge 1300 can comprise an integrally formed sleeve 1302 adapted to be at least partially inserted into the packing bore.

If desired, an internally formed lantern ring 1372 for internal lubrication can be included in the sleeve 1302.

This embodiment illustrates a sealing ring 1358a that is positioned in a sealing ring groove 1359a in the bottom shoulder of the second element 1302. Such a sealing ring 1358a preferably has elastic properties with a relatively high minimum yield and can have relatively low tensile strength. The sealing ring 1358a can be formed, for example, of neoprene or rubber-like material.

Further, in this embodiment of the packing cartridge 1300, an additional o-ring seal 1358b is positioned in a groove 1359b in the outside wall of the sleeve portion 1302 above the integrally formed lantern ring 1372 of the sleeve 1302. In an embodiment of the invention having internal lubrication, it is helpful to having at least one sealing ring both above and below the lantern ring 1372 to help contain the any lubricating or other fluid from leaking around the packing cartridge 1300.

A plurality of structures each forming a circumferential pressure-ring groove 1392; and a pressure ring 1394 positioned in each of the pressure-ring grooves. Preferably, the pressure-ring groove 1392 and the pressure ring 1394 are as first described above with respect to packing cartridge 1000 as illustrated in FIG. 12 and FIG. 12a.

In addition, this embodiment of packing cartridge 1300 illustrates that a sealing ring groove 1396 and a sealing ring 1398 can be positioned adjacent the clearance between the pressure-ring groove 1392 and the pressure ring 1394 to reduce seepage around the clearance. The sealing ring 1398 can be similar to other resilient sealing rings described herein that are useful to prevent fluid leakage or seepage.

Although in each of these illustrated embodiments of packing cartridges according to various aspects and advantageous features of the present invention the bottom sleeve portion is shown to be telescopically inserted into the top sleeve portion, it will be appreciated that the top sleeve portion can be designed according to the invention to be telescopically inserted into the bottom portion. Numerous other variations on the designs according to the invention are contemplated by the present invention as illustrated by the various aspects and preferred embodiments.

Methods of Using Packing Cartridge

According to a still further aspect of the invention, methods of using a packing cartridge according to the invention in a packing bore of a plunger-type pump are provided. In general, the methods include the steps of: inserting the packing cartridge at least partially into the packing bore; and releasably securing the packing cartridge in the packing bore. The method preferably includes additional steps.

For example, prior to inserting the packing cartridge into the packing bore, according to a preferred embodiment of the method steps, the method further includes the step of, prior to inserting the packing cartridge, clearing the packing bore. Preferably, the method further includes the step of, prior to inserting the packing cartridge, inserting a plunger through the packing cartridge. In the alternative, however, the method can further include the step of, after inserting the packing cartridge in the packing bore, inserting the plunger through the packing cartridge.

The step of releasably securing the packing cartridge in the packing bore preferably further comprises the steps of: positioning one end of the packing cartridge against the seat of the packing bore; and tightening a threaded connector to secure a gland over the packing cartridge and capture the packing cartridge in the packing bore.

According to a preferred method, after using the packing cartridge in a plump for a desired period of time, the method further includes the steps of: unsecuring the packing cartridge in the packing bore; removing the packing cartridge out of the packing bore; inserting a similar, replacement packing cartridge into the packing bore; and securing the replacement packing cartridge in the packing bore.

Plunger-Type Pump Having Packing Cartridge and Method of Pumping a Fluid

In addition, according to a still further aspect of the invention, a plunger-type pump is provided having the packing cartridge according any of these described aspects and preferred embodiments of the invention positioned in a packing bore of the pump.

Further, a method of pumping a fluid from a low-pressure fluid source to a high-pressure fluid outlet with the plunger-type fluid pump is provided. According to this further aspect of the invention, the pump is provided with a packing cartridge according to the invention positioned therein. The method comprises the steps of: connecting the low-pressure fluid source to a suction port of the pump; connecting the high-pressure fluid outlet to a discharge port of the pump; and reciprocating the plunger in the packing cartridge and the plunger bore to pump fluid from the low-pressure fluid source to the high-pressure fluid outlet.

Independent Pressure Ring for Packing Bore of a Plunger-Type Pump

Figure 16:
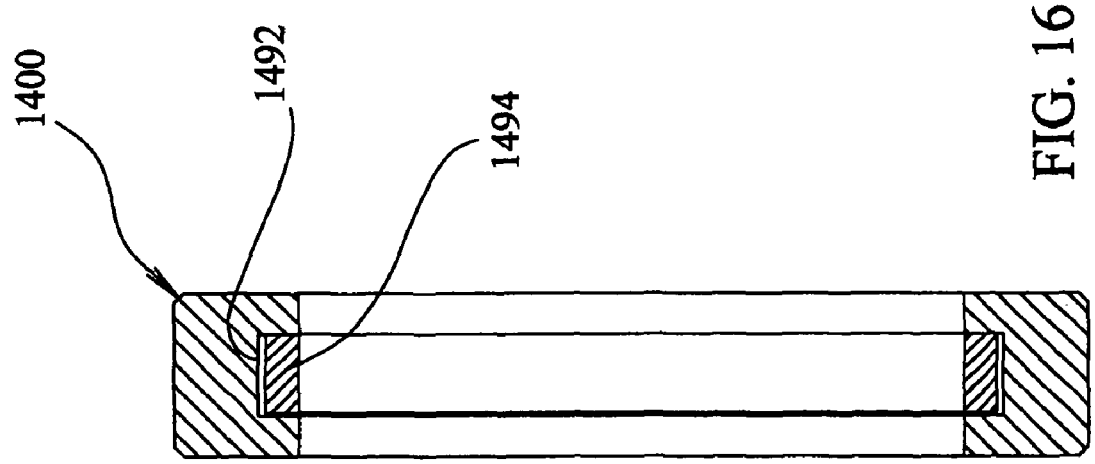
FIG. 16 is a cross-sectional view of a housing ring forming a circumferential pressure-ring groove for a pressure ring. According to this aspect of the invention, this type of housing ring is adapted to be positioned in any type of packing cartridge according to this invention or in any type of original packing bore (not shown in this figure).

FIG. 16 is a cross-sectional view of a housing ring 1400 forming a circumferential pressure-ring groove 1492 for a pressure ring 1494. According to this aspect of the invention, this type of housing ring 1400 is adapted to be positioned in any type of packing cartridge or in any type of original packing bore. The pressure-ring groove 1492 and the pressure ring 1494 are as first described above with respect to FIG. 12 and FIG. 12a.

FIG. 17 is a cross-sectional view of a housing ring 1400 of the type illustrated in FIG. 16, which is included in an otherwise conventional packing stack 42, 44, 46 for use on a plunger 38 in a packing bore 28. The otherwise conventional packing stack is compressed in the packing bore 28 between the seat 29 and a top gland 33. The invention includes methods of using the independent housing ring 1400 in a packing cartridge, especially a packing cartridge according to the present invention, and methods of using the independent housing ring 1400 in an otherwise conventional packing stack for a packing bore.

The invention is described with respect to presently preferred embodiments, but is not intended to be limited to the described embodiments. As will be readily apparent to those of ordinary skill in the art, numerous modifications and combinations of the various aspects of the invention and the various features of the preferred embodiment can be made without departing from the scope and spirit of the invention. It should also be understood, for example, that the function of a single structure described herein can sometimes be performed by more than one part, or the functions of two different structures can be performed by a single or integrally formed part. Especially from manufacturing and cost perspectives, it is preferred to design the storage device to minimize the number of parts. These costs include not only the costs associated with making the parts, but also the costs of assembly. Preferably, the fewest possible number of parts and steps required to manufacture and assemble the apparatus, the better. The invention is to be defined by the appended claims.

What is claimed is:

1. A plunger pump comprising:
 a packing bore for a reciprocating plunger, wherein the packing bore has a generally cylindrical interior wall and a seat and a removable gland, and;
 a packing cartridge wherein the packing cartridge comprising:
  a. a generally-cylindrical sleeve having an outer cylindrical profile least partially positioned in the packing bore;
  b. a first abutment ring positioned in the sleeve;
  c. a second abutment ring positioned in the sleeve and co-axially spaced apart from the first abutment ring;
  d. telescoping structures operatively positioned between the first abutment ring and the second abutment ring to allow for squeezing of the first abutment ring and second abutment ring co-axially closer to one another while the telescoping structures are free to rotate relative to one another as the abutment rings are axially squeezed; and
  e. a retaining ring operatively positioned between the telescoping structures to retain the telescoping structures together and to allow for squeezing of the first abutment ring and second abutment ring co-axially closer to one another, wherein the telescoping structures would not be axially retained together in the absence of the removable gland and the retaining ring;
 wherein the packing cartridge is positioned in the packing bore between the seat and the removable gland so that the squeezing of the first abutment ring and the second abutment ring closer together is provided by the tightening the removable gland over the packing cartridge.

2. The plunger according to claim 1, wherein the telescoping structures have at least sufficient overlapping travel to allow for the expected crushing of packing during the operation of a plunger though the packing cartridge.

3. The plunger pump according to claim 1, further comprising: a spring operatively positioned between the first abutment ring and the second abutment ring.

4. The plunger pump according to claim 3, wherein the telescoping structures have at least sufficient overlapping travel to help maintain the first abutment ring and second abutment ring in substantial co-axial alignment while the spring is anywhere between a substantially relaxed condition and a substantially compressed condition.

5. The plunger pump according to claim 1, wherein the sleeve further comprises a first portion and a second sleeve portion, and wherein the telescoping structures are part the first and second sleeve portions.

6. The plunger pump according to claim 5, wherein the first sleeve portion is positioned in at least a portion of the packing bore; and the second sleeve portion has at least a portion thereof telescopically positioned in at least a portion of the first sleeve portion.

7. The plunger pump according to claim 5, wherein the first abutment ring is operatively connected to the first sleeve portion and the second abutment ring is operatively connected to the second sleeve portion.

8. The plunger pump according to claim 5, wherein the first abutment ring is integrally formed with the first sleeve portion and the second abutment ring is integrally formed with the second sleeve portion.

9. The plunger pump according to claim 5, further comprising a spacer ring operatively positioned to cover the overlapping travel of the telescoping structures between the first and second sleeve portions, wherein the spacer ring is positioned to help prevent seepage of fluid into any clearances between the first sleeve portion and the second sleeve portion 10. The plunger pump according to claim 1, wherein the telescoping structures are a part of the sleeve and one of the first and second abutment rings.

11. The plunger pump according to claim 10, wherein the other one of the first and second abutment rings is integrally formed with the sleeve.

12. The plunger pump according to claim 1, wherein the retaining ring comprises a resilient ring adapted to be positioned in a groove in one of the telescoping structures, whereby the resilient ring frictionally engages the other telescoping structure to resist separation of the telescoping structures.

13. A plunger pump according to claim 1, further comprising: packing positioned between the first abutment ring and the second abutment ring.

14. The plunger pump according to claim 13, wherein the packing further comprising a plurality of packing elements.

15. The plunger pump according to claim 14, wherein at least one packing spacer is positioned between any two of the plurality of packing elements.

16. The plunger pump according to claim 1, wherein the telescoping structures and the retaining ring are operative to allow a packing to be held in a pre-assembled but relaxed conditioned.

17. The plunger pump comprising:
 a packing bore for a reciprocating plunger, wherein the packing bore has a generally cylindrical interior wall and a seat and a removable gland, and;
 a packing cartridge, wherein the packing cartridge comprises:
  a. a first element comprising:
   i. a first sleeve portion having a outer cylindrical profile positioned in at least a portion of the packing bore; and
   ii. a first abutment ring positioned to extend inwardly and substantially circumferentially relative to the first sleeve portion; and
  b. a second element comprising:
   i. a second sleeve portion having at least a portion thereof telescopically positioned in at least a portion of the first sleeve portion; and
   ii. a second abutment ring positioned to extend inwardly and substantially circumferentially relative to the second sleeve portion; and
  c. a means for axially retaining the first and second sleeve portion together, wherein the first and second sleeve portion would not be axially retained together in the absence of the removable gland and the means for axially retaining;
 wherein the first sleeve portion and the second sleeve portion and the means for axially retaining are operatively positioned between the first abutment ring and the second abutment ring to allow for squeezing of the first abutment ring and second abutment ring co-axially closer to one another while the first and second sleeve are free to rotate relative to one another as the first and second abutment ring are axially squeezed together; and
 wherein the packing cartridge is positioned in the packing bore between the seat and the removable gland so that the squeezing of the first abutment ring and the second abutment ring closer together is provided by tightening the removable gland over the packing cartridge.

18. The plunger pump according to claim 17, further comprising a spacer ring operatively positioned to cover the overlapping travel of the first and second sleeve portions wherein the spacer ring is positioned to help prevent seepage of fluid into any clearance between the first sleeve portion and the second sleeve portion.

19. The packing cartridge according to claim 17, further comprising: a spring operatively positioned between the first abutment ring and the second abutment ring.

20. The plunger pump according to claim 19, wherein the telescoping first and second sleeve portions have at least sufficient overlapping travel to help maintain the first abutment ring and second abutment ring in substantial co-axial alignment while the spring is anywhere between a substantially relaxed condition and a substantially compressed condition.

21. A plunger pump according to claim 17, further comprising: packing positioned between the first abutment ring and the second abutment ring.

22. The plunger pump according to claim 21, wherein the packing further comprising a plurality of packing elements.

23. The plunger pump according to claim 22, wherein at least one packing spacer is positioned between any two of the plurality of packing elements.

24. The plunger pump according to claim 17, wherein the first abutment ring is integrally formed with the first sleeve portion and the second abutment ring is integrally formed with the second sleeve portion.

25. The plunger pump according to claim 17, wherein the means for axially retaining comprises:
   a. a retaining groove and an interference surface cooperatively positioned between the first and second sleeve portions; and
   b. a resilient ring positioned in the retaining groove for frictionally engaging the interference surface, whereby when the resilient ring in the retaining groove is moved axially against the interference surface, the resilient ring frictionally engages the interference surface and resists separation of the first and second sleeve portions.

26. The plunger pump according to claim 17, wherein the first and second sleeve portions and the means for axially retaining are operative to allow a packing to be held in a pre-assembled but relaxed condition.

27. A plunger pump comprising:
   a packing bore for a reciprocating plunger, wherein the packing bore has a generally cylindrical interior wall and a seat and a removable gland, and;
   a packing cartridge wherein the packing cartridge comprising:
   a. a generally-cylindrical sleeve having an outer cylindrical profile least partially positioned in the packing bore;
   b. a first abutment ring positioned in the sleeve;
   c. a second abutment ring positioned in the sleeve and co-axially spaced apart from the first abutment ring;
   d. packing positioned between the first abutment ring and the second abutment ring;
   e. telescoping structures operatively positioned between the first abutment ring and the second abutment ring to allow for squeezing of the first abutment ring and second abutment ring co-axially closer to one another while the telescoping structures are free to rotate relative to one another as the abutment rings are axially squeezed; and
   f. a retaining ring operatively positioned between the telescoping structures to retain the telescoping structures together and to allow for squeezing of the first abutment ring and second abutment ring co-axially closer to one another, wherein the telescoping structures would not be axially retained together in the absence of the removable gland and the retaining ring;
   wherein the packing cartridge is positioned in the packing bore between the seat and the removable gland so that the squeezing of the first abutment ring and the second abutment ring closer together is provided by the tightening the removable gland over the packing cartridge; and
   wherein the telescoping structures and the retaining ring are operative to allow the packing to be held in a pre-assembled but relaxed condition.

28. The plunger pump according to claim 27, further comprising: a spring operatively positioned between the first abutment ring and the second abutment ring.

29. The plunger pump according to claim 28, wherein the telescoping structures have at least sufficient overlapping travel to help maintain the first abutment ring and second abutment ring in substantial co-axial alignment while the spring is anywhere between a substantially relaxed condition and a substantially compressed condition.

30. The plunger pump according to claim 29, wherein the sleeve further comprises a first sleeve portion and a second sleeve portion, and wherein the telescoping structures are a part of the first and second sleeve portion.

31. The plunger pump according to claim 30, further comprising a spacer ring operatively positioned to cover the overlapping travel of the telescoping structures between the first and second sleeve portions, wherein the spacer ring is positioned to help prevent seepage of fluid into any clearances between the first sleeve portion and the second sleeve portion.

* * * * *